US006671334B1

(12) United States Patent
Kuntz et al.

(10) Patent No.: US 6,671,334 B1
(45) Date of Patent: Dec. 30, 2003

(54) MEASUREMENT RECEIVER DEMODULATOR

(75) Inventors: Thomas L. Kuntz, Portland, OR (US); Xiaofen Chen, West Linn, OR (US); Nikhil M. Deshpande, Beaverton, OR (US); Kyle L. Bernard, Tigard, OR (US)

(73) Assignee: Tektronix, Inc., Beaverton, OR (US)

( * ) Notice: Subject to any disclaimer, the term of this patent is extended or adjusted under 35 U.S.C. 154(b) by 0 days.

(21) Appl. No.: 09/185,419

(22) Filed: Nov. 3, 1998

(51) Int. Cl.[7] .............................................. H04L 27/06
(52) U.S. Cl. ...................................... 375/340; 375/349
(58) Field of Search ................................. 375/229, 316, 375/340, 346, 349, 350; 329/315, 347, 372, 316

(56) References Cited

U.S. PATENT DOCUMENTS

| 5,214,391 A | * | 5/1993 | Serizawa et al. ............ 329/316 |
| 5,671,253 A | | 9/1997 | Stewart |
| 6,192,090 B1 | * | 2/2001 | Lee ............................ 375/346 |

OTHER PUBLICATIONS

"VSB Modulation Used for Terrestrial and Cable Broadcasts" by Gary Sgrignoli, Wayne Bretl, Richard Citta, Zenith Electronics Corporation, Jun. 1995.

* cited by examiner

Primary Examiner—Stephen Chin
Assistant Examiner—David B. Lugo
(74) Attorney, Agent, or Firm—William K. Bucher

(57) ABSTRACT

A measurement receiver demodulator has a first processing channel for producing a filtered signal sample output where the signal samples are processed through a transmission system receiver filter and a second processing channel producing an unfiltered signal sample output where the signal samples are not processed through the transmission system receiver filter. The first processing channel down converts digitally modulated IF signal samples and filters the down converted signal samples using a combined transmission system receiver filter and front end hardware compensation filter. A synchronizer produces timing phase and rate offset parameters that are applied to a resampling filter to synchronize the filtered signal samples to symbol instances of the symbol modulation. The filtered, time-aligned signal samples are scaled using a derived scaling factor. A pilot offset level, if present, is estimated and removed. The resultant signal samples are processed through an equalizer to produce filtered, time-aligned, scaled equalized signal samples that are output as filtered signal samples. The second processing channel receives the down converted signal samples and uses compensation and equalization filter coefficients, timing parameters, and the scaling from the first processing channel in compensation, resampling and equalization filters and a scaler to produce compensated, time-aligned, scaled equalized signal samples that are output as unfiltered signal samples.

9 Claims, 18 Drawing Sheets

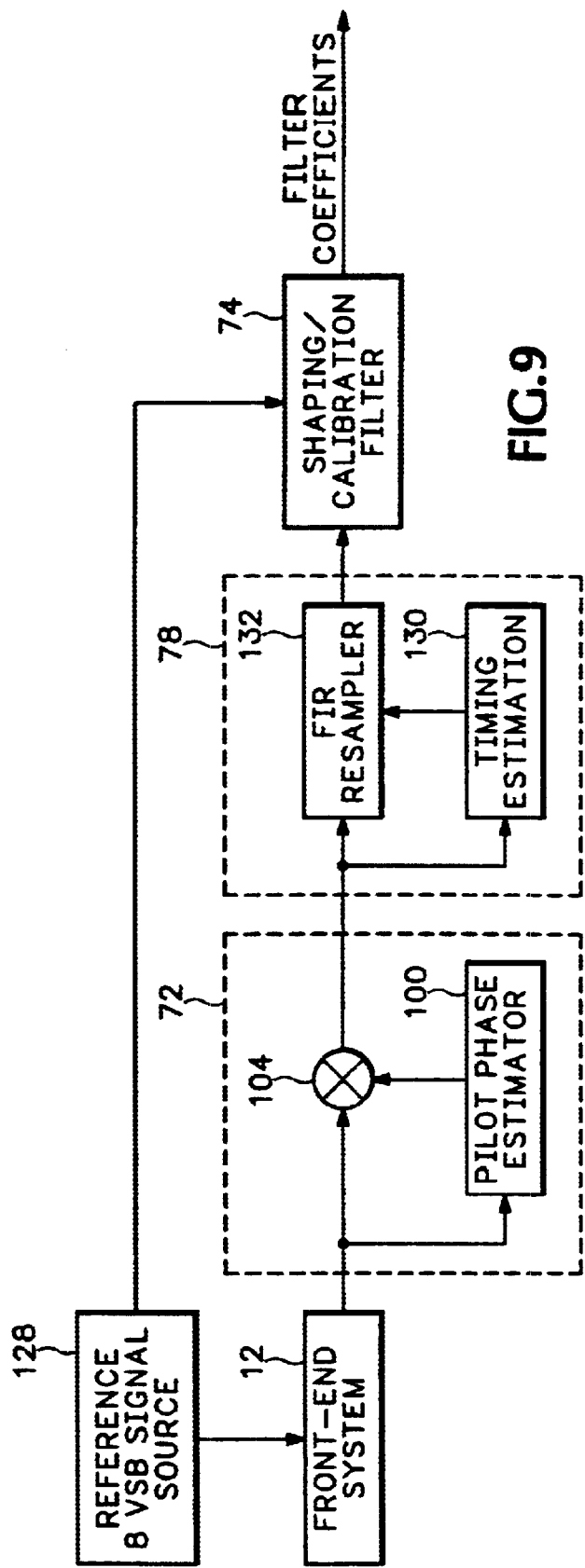

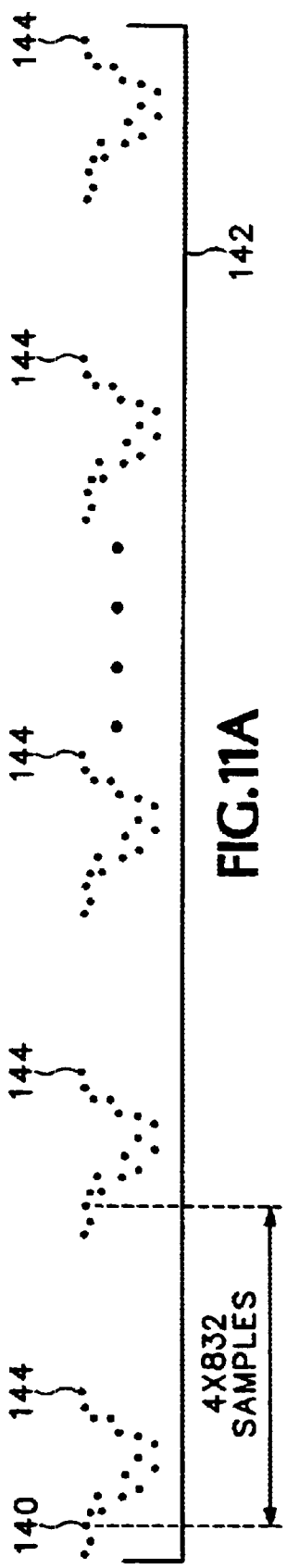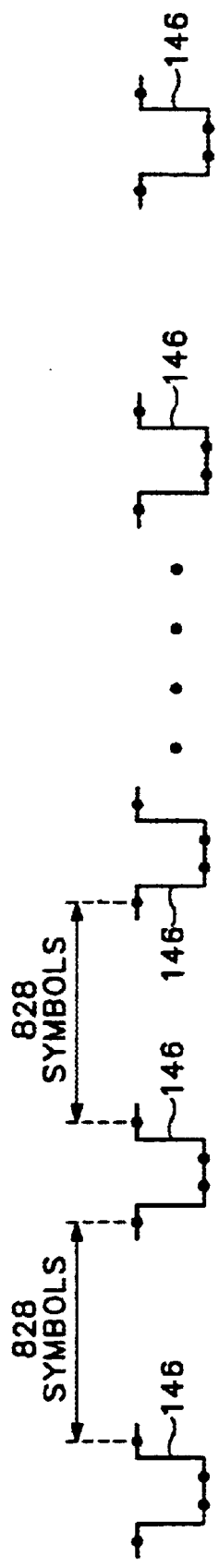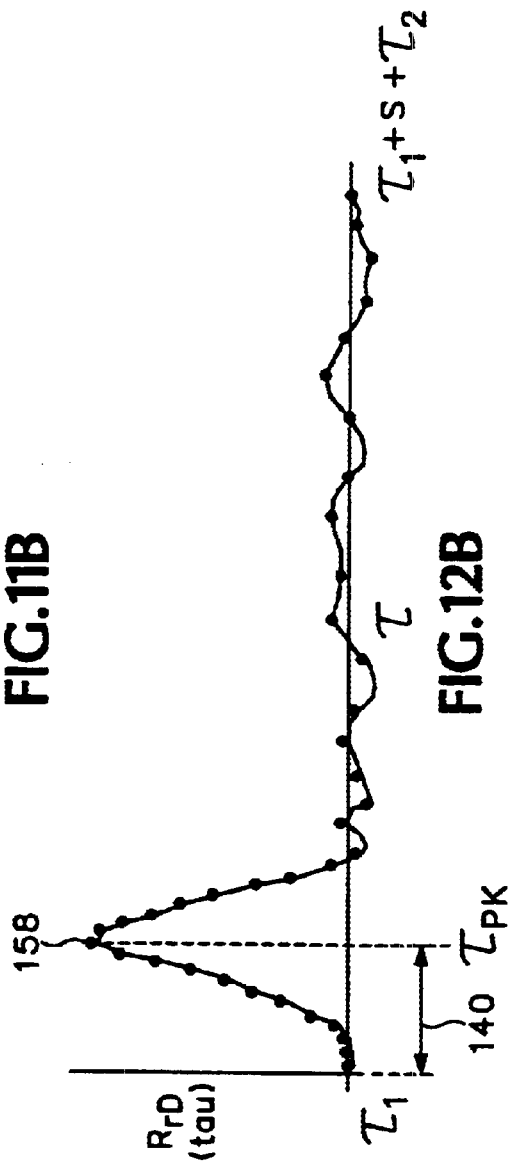

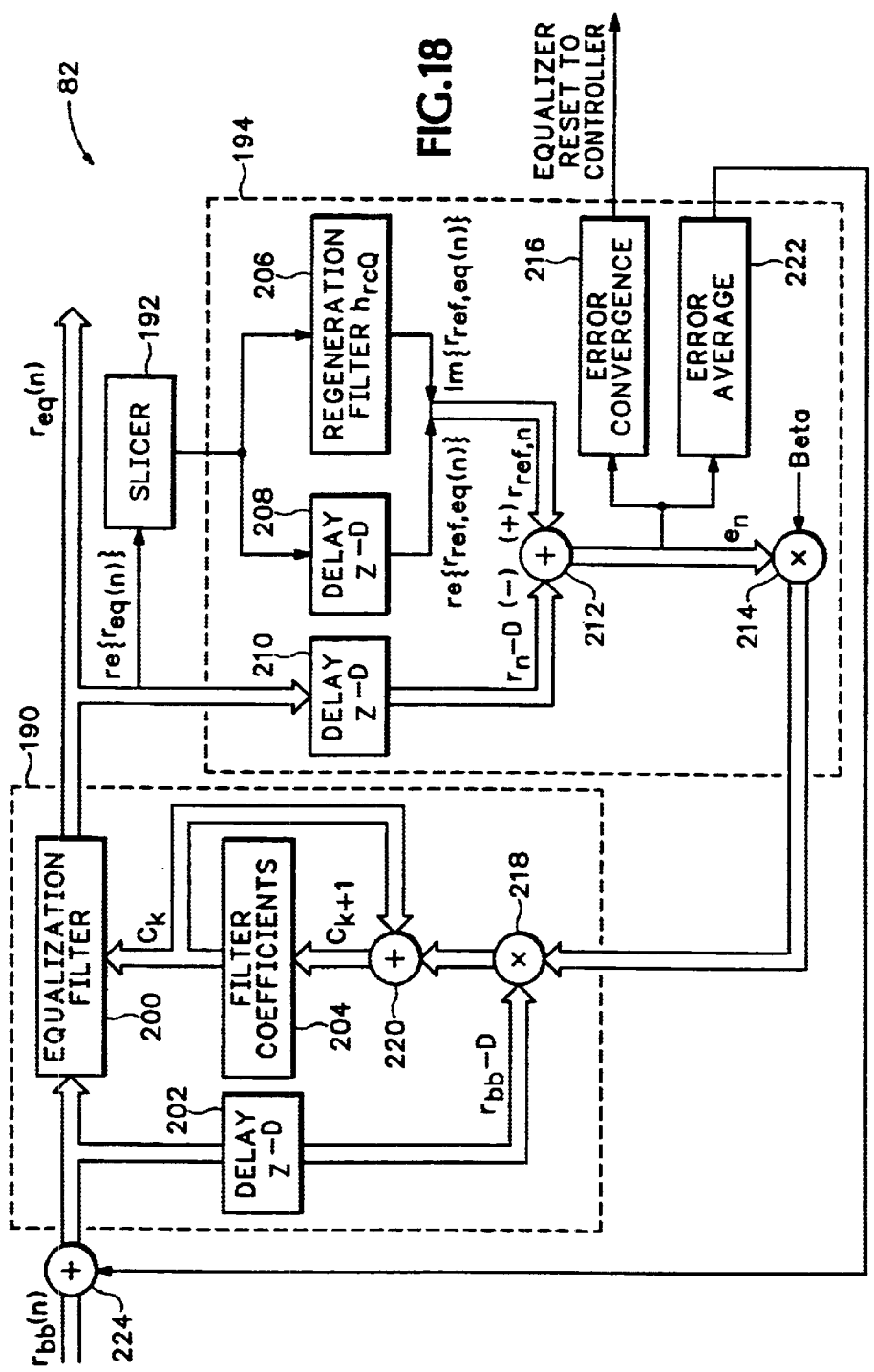

MEASUREMENT RECEIVER DEMODULATOR

BACKGROUND OF THE INVENTION

The present invention relates generally to demodulators and more particularly to a demodulator for measurement receivers.

Measurement receivers, such as spectrum analyzers, vector signal analyzers, and the like, receive an RF input signal and down convert the RF signal to an intermediate frequency (IF) signal in a superheterodyne process to allow measurements to be made on the signal. The RF carrier signal being measured generally contain modulation information which is measured by the measurement receiver. Some measurement receiver, such as the 2715 Spectrum Analyzer, manufactured by Tektronix, Inc., include specialized circuitry for making measurements on particular types of signals. The 2715 Spectrum Analyzer includes circuitry for making automated cable television measurements on NTSC signals, such as in-service measurements for in-channel carrier-to-noise ratio, composite triple beats, and the like.

Receivers designed for receiving broadcast signal, such as radio and television signals, include front end down converter circuitry and a demodulator for extracting the modulated information from the broadcast signal. Such demodulators are designed to remove or suppress signal distortions, such as noise and the like, that are produced during the generation, transmission, and reception of the broadcast. However, signal distortions affect the quality of the broadcast signal and measuring these distortions are of interest to broadcast engineers. This is especially true for the new digital television standard adapted by the Federal Communications Commission.

The Digital Television Standard was developed by the Advanced Television Systems Committee (ATSC) to transmit high quality video, audio and ancillary data over a 6 MHZ channel. The Standard describes the channel coding and modulation RF/transmission subsystems for terrestrial and cable applications. The modulation subsystem uses a digital data stream to modulate the transmitted signal and may be implemented in two modes: a terrestrial broadcast mode (8-VSB) delivering about 19 Mbps, and a higher data rate mode (16-VSB) delivering about 38 Mbps for cable television systems where higher signal to noise is ensured.

The modulation technique implemented in the Digital Television Standard was developed by Zenith Corp. and employs vestigial sideband modulation. The overall system response of the transmitter and receiver filtering corresponds to a raised cosine filter to avoid system generated intersymbol interference. The system response is implemented with serially coupled, nominally identical root raised cosine filters in the transmitter and in the receiver.

The incoming digital data stream is randomized, forward-error-correction (FEC) encoded and interleaved. The randomized, FEC coded and interleaved data is trellis encoded as an 8-level (3-bit) one dimensional constellation. The outputs of the trellis coder are mapped into symbols that are one of eight symmetric odd-valued integer levels from −7 to +7 units. To aid synchronization in low signal to noise and/or high multipath situations, segment and field syncs are inserted in the 10.76 Msymbols/sec symbol stream. A small pilot tone is added as well at the carrier frequency generated by offsetting the real or I channel of the complex signal containing the data and the sync pulses by 1.25 units. The offset causes the pilot tone to be in-phase with the I channel signal component. At the transmitter, the composite signal passes through a root raised cosine filter and modulates an intermediate frequency carrier signal which is up-converted to an RF frequency for transmission at the desired channel frequency. Alternately, the composite signal may be used to directly modulate the RF carrier.

The Hewlett-Packard HP 89441A Vector Signal Analyzer is a general purpose measurement instrument having specialized filters and processes for making measurements on a number of RF modulated signals, such as 8-VSB signals, IS-95 wireless communication signals and the like. The HP 89441A includes a superheterodyne receiver having a first LO and mixer for up-converting the incoming signal to a first IF frequency. Second and third LOs and mixers respectively generate second and third IF frequencies of 40 MHz and 10 MHz. The 10 MHz IF is digitized by an analog-to-digital converter with the digitized data being down converted to baseband data. The baseband data values are passed to a digital signal processor for FFT conversion and additional signal processing. The 89441A includes a user interface for selecting the appropriate filter for the signal being measured including no filter at all. For an 8-VSB signal, a root-raise cosine transmission system receiver filter is applied to the 8-VSB signal. One of the measurements displayed by the 89441A is a constellation display of the 8-VSB symbols in I and Q space. It has been observed that removing the root-raised cosine filter before the 8-VSB constellation measurement results in no constellation output display. From this observation and the fact that the instrument does not provide nonlinearity measurement outputs, is it assumed that only filtered 8-VSB measurements can be made with this instrument.

The received signal in transmission systems, such as the 8-VSB digital television system, generally contain distortions caused by the system's transmitter and receiver and the medium which through the signal travels. The existence of these distortions can severely degrade the signal quality of a digitally transmitted signal. Often the distortions present in the received signal are a mixture of linear and nonlinear magnitude errors, linear and nonlinear phase error, additive noise, and phase noise. To monitor the quality of the transmitted signal and to trouble-shoot a degraded transmission system, accurate measurements of these distortions are very useful. However, traditional demodulators suppress some of these distortions, in part, by applying the transmission system receiver filter to the incoming signal. Since linear and nonlinear transfer functions are not usually commutative, meaning that the nonlinear functions observed from the demodulated baseband signal are different from the original nonlinear functions produced by the power amplifier at the transmitter, it is difficult to derive the original nonlinear transfer function from what is observed from the demodulated baseband signal for performing, for example, transmitter nonlinearity measurements, especially with a randomized digital signal. Also, strong nonlinearity causes signal spectrum spreading. The transmission system's receiver filter could significantly attenuate the out-of-band portion of the spread spectrum signal with the loss of spectral information characterized by the nonlinear distortions.

What is needed is a demodulator for a measurement receiver that measures various type of distortions generated in a digital transmission system. Such a demodulator needs to produce multiple types of outputs for measuring linear and nonlinear type of distortions, as well as carrier phase jitter. The demodulator needs to be efficiently implemented and flexible in design for easy modification for demodulating different types of signal.

SUMMARY OF THE INVENTION

Accordingly, an object of the present invention is a demodulator that produces filtered and unfiltered signal samples where the filtered signal samples are processed through a transmission system receiver filter and the unfiltered signal samples are not.

An additional object of the present invention is a demodulator that produces synchronization parameters, a scaling factor and filter coefficients using transmission receiver filter signal samples in a first processing channel for use in producing unfiltered signal samples in a second processing channel.

A measurement receiver receives a radio frequency signal modulated with digital symbols at a symbol rate and generated by a transmission system having a transmitter filter and a receiver filter. The receiver down converts the modulated radio frequency signal to a modulated intermediate frequency signal and digitizes the signal using hardware front end circuitry to produce signal samples of the intermediate frequency signal. The measurement receiver demodulator receives the signal samples and produces filtered signal samples using the transmission system receiver filter in a first processing channel and produces unfiltered signals by bypassing the transmission system receiver filter in a second processing channel. The first processing channel further includes subchannels with one subchannel producing filtered equalized signal samples and a second subchannel producing filtered unequalized signal samples. The second processing channel further includes subchannels with one subchannel producing unfiltered equalized signal samples and a second subchannel producing unfiltered unequalized signal samples.

The first and second subchannels of the first processing channel include a down converter receiving the intermediate frequency signal samples and produces baseband signal samples. The baseband signal samples are processed by a digital filter having combined filter coefficients producing a transmission system receiver filter response and compensating for the hardware front end circuitry to generate filtered baseband signal samples. Alternatively, a first digital filter having filter coefficients compensating for the hardware front end circuitry receives the baseband signal samples and generating compensated baseband signal samples and a second digital filter having filter coefficients producing a transmission system receiver filter response receives the compensated baseband signal samples and generates filtered baseband signal samples.

A symbol timing synchronizer receives the filtered baseband signal samples, the combined filter coefficients and the baseband signal samples. A timing estimator in the synchronizer receives the filter coefficients and the baseband signal samples and generates timing phase and rate offsets parameters that are applied to a resampler in the synchronizer to produce time-aligned, filtered baseband signal samples. A scalar receives the time-aligned, filtered baseband signal samples and estimates a scaling factor that is applied to the signal samples to produce scaled, time-aligned, filtered baseband signal samples. If the modulated RF signal to the receiver contains a pilot tone, a pilot level remover may be provided to receive the scaled, time-aligned, filtered baseband signal samples that estimates and removes the pilot level from the filtered, time-aligned, scaled signal samples. The filtered, time-aligned, scaled signal samples are output as filtered unequalized signal samples from the second subchannel. Alternately, the scalar and pilot level remover may be combined. An equalizer receives the scaled, time-aligned, filtered baseband signal samples and generates equalizer coefficients that are applied to an equalization filter to produce equalized, scaled, time-aligned, filtered baseband signal samples that are output as filtered equalized signal samples from the first subchannel.

In a further embodiment of the present invention where the intermediate frequency signal samples are acquired at N times the symbol frequency, where N is greater than 1, the first and second subchannels may each include a down sampler, having a decimation factor up to N, receiving respective scaled, time-aligned, filtered baseband signal samples and the equalized, scaled, time-aligned, filtered baseband signal samples for generating down sampled scaled, time-aligned, filtered baseband signal samples and down sampled equalized, scaled, time-aligned, filtered baseband signal samples that are respectively output filtered unequalized signal samples and filtered equalized signal samples from the first subchannel.

The second processing channel receives baseband signal samples and includes a first digital filter receiving the filter coefficients that compensate for the hardware front end circuitry from the first processing channel. The filter coefficients and the baseband signal samples are applied to the digital filter to generate compensated baseband signal samples. A resampling filter receives the timing phase and rate offsets parameters from the symbol timing synchronizer of the first processing channel and the compensated baseband signal samples. The signal samples and parameters are applied to the resampling filter to produce time-aligned, compensated baseband signal samples. A scalar receives the scaling factor from the first processing channel scalar and the time-aligned, compensated baseband signal samples to generate scaled, time-aligned, compensated baseband signal samples that are output as unfiltered unequalized signal samples from the second subchannel. A second digital filter receives the equalizer coefficients from the first processing channel equalizer and the scaled, time-aligned, compensated baseband signal samples to produce equalized, scaled, time-aligned baseband signal samples that are output as unfiltered equalized signal samples from the first subchannel.

The objects, advantages and novel features of the present invention are apparent from the following detailed description when read in conjunction with the appended claims and attached drawings.

BRIEF DESCRIPTION OF THE DRAWINGS

FIG. 9 is a representative block diagram illustrating the calibration system and process for the measurement receiver demodulator according to the present invention.

FIG. 11A is a representative diagram of signal samples of repetitive symbol sync sequences having intersymbol interference used in the symbol timing synchronizer and resampler incorporated in the measurement receiver demodulator according to the present invention.

FIG. 11B is a representative diagram of a reference pattern of ideal symbol sync sequences used in the symbol timing synchronizer and resampler incorporated in the measurement receiver demodulator according to the present invention.

FIGS. 12A and 12B are respective representations of the cross-correlation process and the resulting data used in the symbol timing synchronizer and resampler incorporated in the measurement receiver demodulator according to the present invention.

FIG. 18 is a more detailed block diagram illustrative of the adaptive equalizer with complex signal regeneration incorporated in the measurement receiver demodulator according to the present invention.

DETAILED DESCRIPTION OF THE PREFERRED EMBODIMENT

In the following detailed description numerous specific details are set forth in order to provide a thorough understanding of the present invention. However, it will be understood by those skilled in the art that the present invention may be practiced without these specific details. In other instances well known methods, procedures, components, and circuits have not been described in detail so as not to obscure the present invention.

Part of the description will be presented in terms of operations performed by a computer system, using terms such as data, values, signal samples, flags, numbers and the like, consistent with the manner commonly employed by those skilled in the art to convey the substance of their work to others skilled in the art. As is well understood by those skilled in the art, these quantities take the form of electrical, magnetic, or optical signals capable of being stored, transferred, combined and otherwise manipulated through mechanical and electrical components of the computer system; and the term computer system includes general purpose as well as special purpose data processing machines, systems, and the like, that are stand alone, adjunct or embedded.

Additionally, various operations will be described as multiple discrete steps in turn in a manner that is most helpful in understanding the present invention, however, the order of description should not be construed as to imply that these operations are necessarily order dependent, in particular, the order of their presentation.

The measurement receiver demodulator of the present invention provides multiple filtered and unfiltered outputs from different processing channels for performing multiple kinds of measurements on a broad range of signals from various transmission systems. The modulator of the present invention is implemented in software to provide the flexibility for analyzing the transmission system signal. However, the basic multiple filtered and unfiltered outputs from different processing channels concept for a demodulator may equally be implemented in hardware or with a combination of software and hardware. The preferred embodiment of the present invention will be described in relation to a particular digital transmission system, specifically an 8-VSB digital television transmission system, and is not considered as being limited to this particular digital transmission system. An 8-VSB RF signal has data symbols that modulate the RF carrier at approximately 10.76 Msymbols/sec along with a pilot tone or signal embedded in the data symbols. The demodulator outputs for the 8-VSB signal are complex valued signal samples having I-component values and Q-component values.

Figure 1:
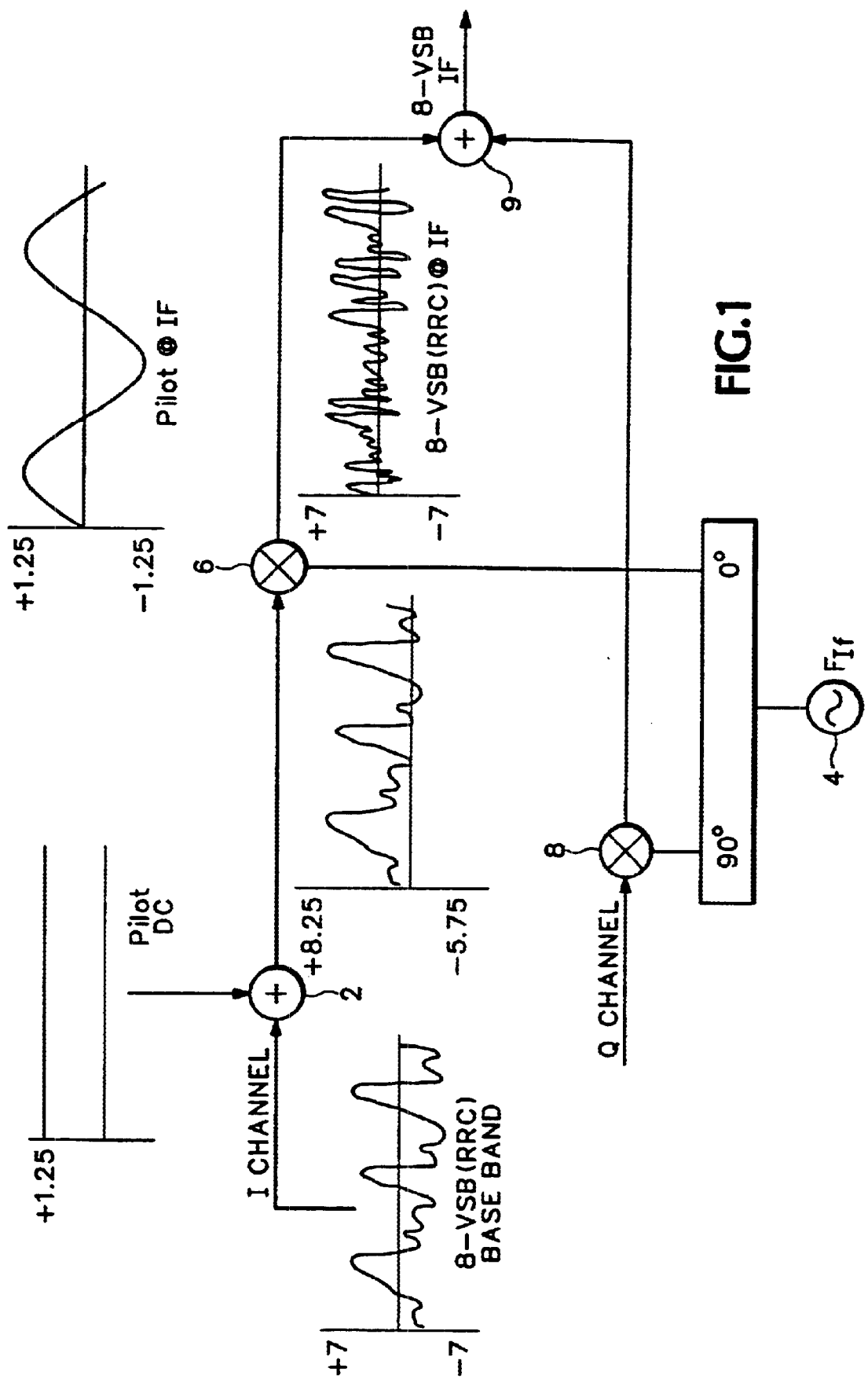
FIG. 1 is a simplified representation illustrative of the relationship of the I-channel signal and the pilot of an 8-VSB IF signal.

FIG. 1 is a simplified representation illustrating the relationship of the I-channel signal and the pilot of an 8-VSB IF signal. The 8-VSB signal is a trellis coded signal having eight odd integer symbol levels or values from −7 to +7 that are passed through a root raised cosine filter in the transmitter. At baseband, the pilot signal is a DC level that is combined with the I channel trellis coded signal in summing circuit 2. The offset I channel signal modulates an IF signal from a local oscillator 4 in modulator 6. The DC pilot modulates the IF signal in modulator 6, which produces a tone at the IF frequency. The Q channel signal modulates the IF signal from the local oscillator 4 that is 90° out of phase with the I channel IF oscillator signal in modulator 8. The IF I and Q channel signals are combined in summing circuit 9 to produce a compound signal having the pilot sinusoid embedded in the 8-VSB IF modulated signal.

Figure 2:
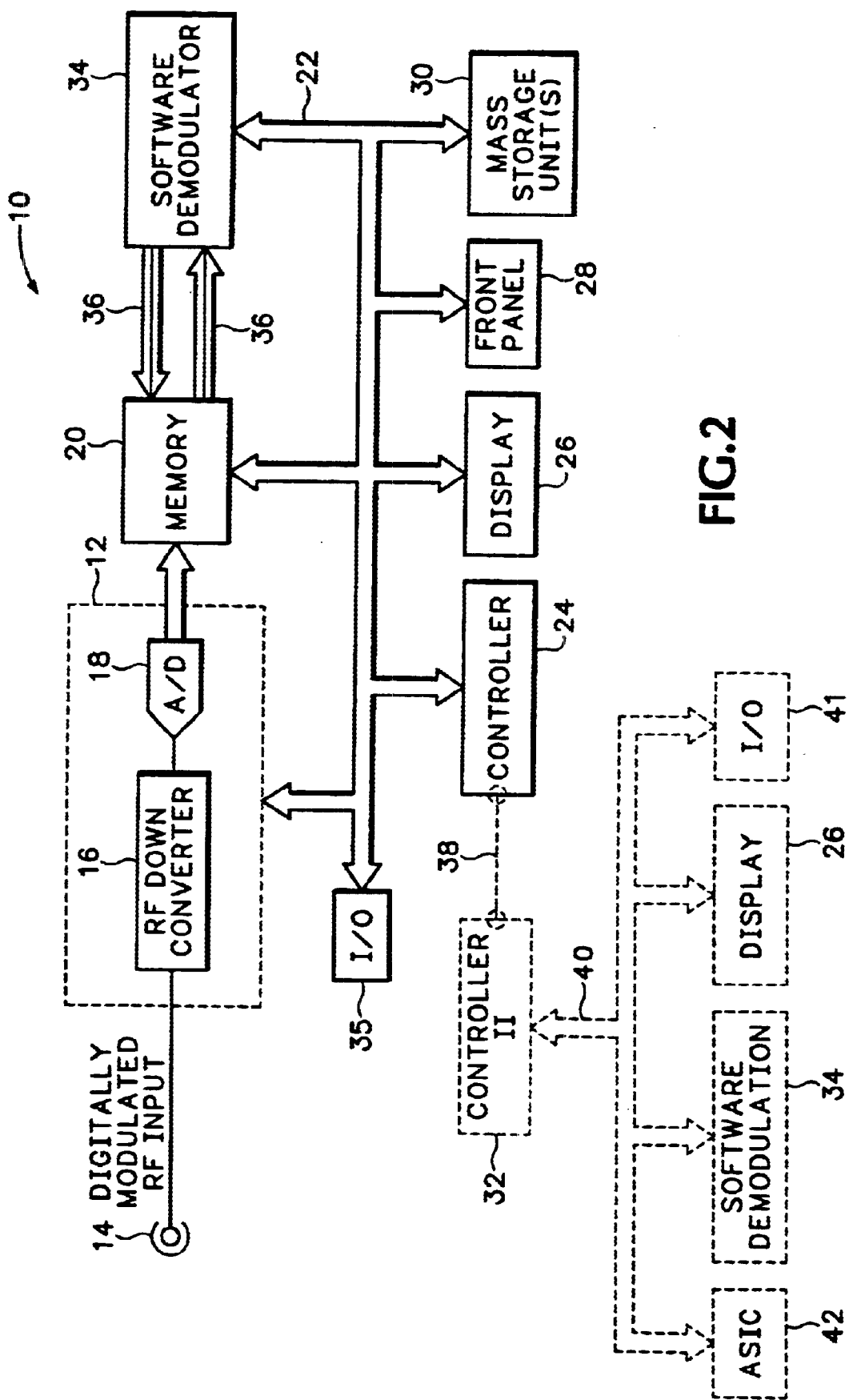
FIG. 2 is a block diagram illustrative of a receiver system incorporating the measurement receiver demodulator according to the present invention.

FIG. 2 shows a representative block diagram of a measurement receiver 10, as could be used in measuring a digital television signal or other types of modulated transmitted signals. The measurement receiver 10 includes a hardware front end 12 receiving a modulated RF input signal 14. The RF carrier may be modulated by either an analog or digital signal with the preferred embodiment being an 8-VSB digital signal. The 8-VSB modulated RF signal 14 is down converted to a digitally modulated intermediate frequency (IF) signal by RF hardware down converter circuitry 16 that generally includes one or more mixers in the IF signal path. Each mixer is driven by a local oscillator. An analog-to-digital (A/D) converter 18 receives the digitally modulated IF signal and converts the signal to digital data values that are stored in memory 20. Memory 20 includes both RAM, ROM and cache memory with the RAM memory storing volatile data, such as the data values representative of the IF signal and the like. A data and control bus 22 couples memory 20 to a controller 24, such as PENTIUM® microprocessor, manufactured and sold by Intel, Corp., Santa Clara, Calif. The data and control bus 22 may also be coupled to the front end hardware 12, a display device 26, such a liquid crystal display, cathode ray tube or the like, and a front panel 28 with buttons, rotatable knobs and the like and/or control entry devices, such as a keyboard and/or mouse. A mass storage unit or units 30, such as a hard disk drive, a CD ROM drive, a tape drive, a floppy drive or the like, that reads from and/or writes to appropriate mass storage media, may also be connected to the data and control bus 22. A demodulator 34 is representatively shown connected to the bus 22 and coupled to memory 20. In the preferred embodiment, the demodulator 34 is software based and executes various processes that are performed by the controller 24 using processing routines stored in memory 20. Data flow lines 36 connect the memory 20 with the software demodulator 34 for showing the movement of data from the memory 20 to the software demodulation process and back. The program instructions may be stored and accessed from the ROM memory 20 or from the mass storage media of the mass storage unit 30. The measurement receiver 10 in the preferred embodiment of the invention is a PC based system controlled under WINDOWS® 95 operating system, manufactured and sold by Microsoft, Corp., Redmond, Wash. Graphical plotting software, such as PROESSENTIALS™ Graphic Display Software, manufactured and sold by Gigasoft, Inc. Keller Tex., is used for generating graphical representations of measurements. The measurements may also be exported using an I/O device 35. The demodulator 34 of the present invention may also be implemented using hardware circuitry performing the same functions as described for the software implementation. Alternately, a hybrid system using multiple controllers, such as controller 32 connected to controller 24 via a serial bus 38, may be used to implement the measurement receiver 10 and the demodulator functions of the present invention. The controller 32 is coupled to a separate data and control bus 40. Controller 32 may separately control display device 26 or perform a portion or portions of the software demodulator 34 functions. An I/O device 41 may be coupled to the control bus 40 for exporting the results of the software demodulator function or the measurements. Further the demodulator 34 functions may be implemented using both hardware circuitry, as represented by ASIC 42 and software routines performed by the controller 24 or controllers 24 and 32.

Figure 3:
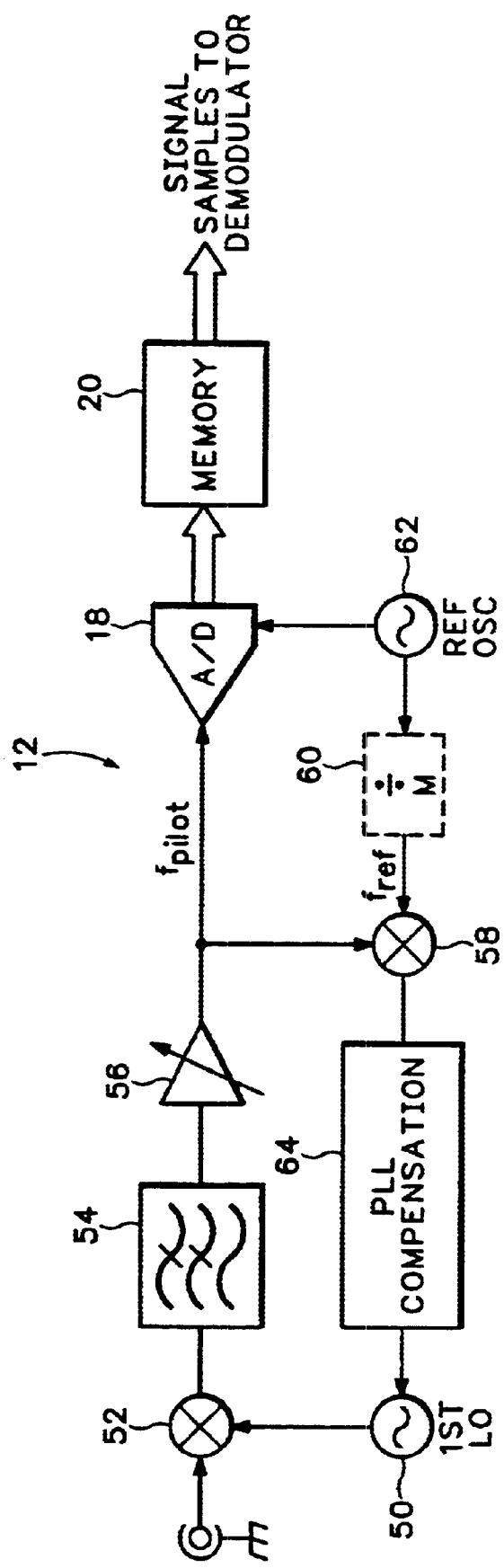
FIG. 3 is a representative block diagram illustrating the hardware front end circuitry in receiver system incorporating the measurement receiver demodulator according to the present invention.

Referring to FIG. 3, there is shown a representative block diagram of the hardware front end 12 of the measurement receiver 10 implementing an optimum relationship between a digitally modulated IF carrier and a sampling signal that drives an A/D converter at four times the IF carrier. The hardware front end 12 of the measurement receiver 10 is described in greater detail in co-pending patent application Ser. No. 09/054,976, filed Apr. 3, 1998. The RF down converter 16 includes a 1st local oscillator (LO) 50 tunable over at range of frequencies by the microprocessor 24 for generating an output signal that mixes with an incoming digitally modulated RF signal in mixer 52. A low pass filter 54, which is very wide with respect to the IF bandwidth used by the receiver, removes the sum products of the mixer 52 and any local oscillator 50 signal that may feed through (i.e. leak) the mixer 52. In this embodiment, the output of low pass filter 54 is a digitally modulated intermediate frequency signal having the pilot signal $f_{pilot}$ nominally at the same frequency as the digital symbol frequency, which for an 8-VSB system is approximately 10.76 MHz. As noted in co-pending patent application Ser. No. 09/054,976, the frequency of the IF signal may be at other frequencies. A variable gain amplifier 56 amplifies the IF signal and couples the amplified IF signal to the input of A/D converter 18 and a 2nd mixer 58, operating as a phase detector. The phase detector 58 receives a reference signal $f_{ref}$ (i.e. 10.76 MHz) from a divide by M circuit 60 interposed between a reference oscillator 62 and the phase detector 58 for dividing down the reference oscillator 62 signal to the digital modulation frequency. The reference oscillator 62 generates a reference oscillator signal having a frequency that is four times the digital modulation frequency or approximately 43.04 MHz. The phase difference signal from the phase detector 58 passes through a Phase Locked Loop (PLL) compensation filter 64 and then controls the 1st LO 50 for phase locking the IF carrier to the reference signal. The output signal from the reference oscillator 62 is also coupled to the clock input of the A/D converter 18 for sampling the IF signal at the input of the A/D converter 18. The A/D converter 18 generates the signal samples r(n) representative of the IF signal which are stored in a memory 20 for further processing by the demodulator 34. A one to four relationship exists between the IF carrier frequency and a sampling frequency that drives an analog-to-digital (A/D) converter generating the signal samples. That is four samples are acquired for each cycle of the IF carrier signal's pilot frequency.

Figure 4:
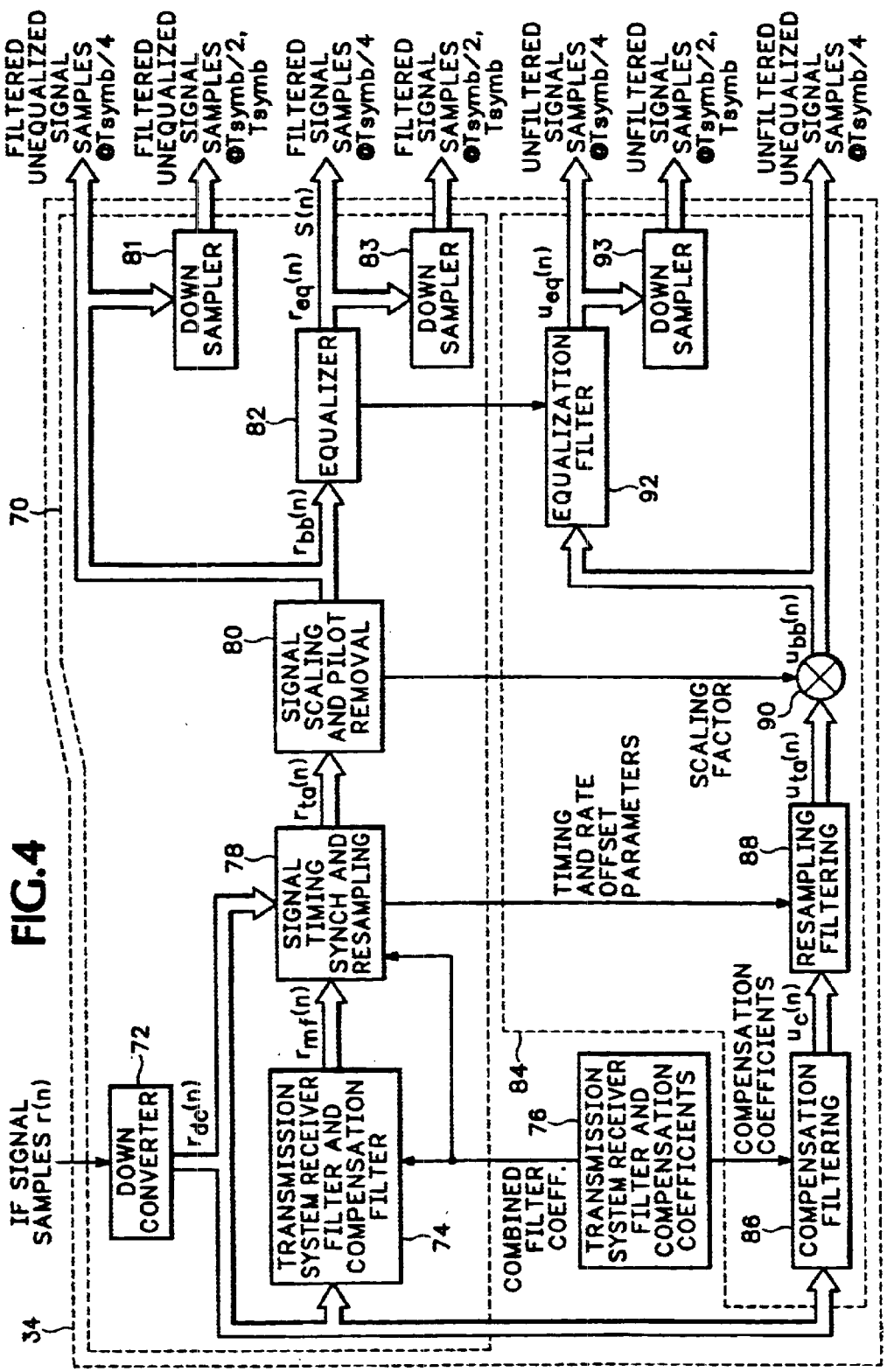
FIG. 4 is a block diagram illustrating the measurement receiver demodulator according to the present invention.

In the below described embodiment of the measurement receiver demodulator 34, the signal samples from each process are stored in memory 20 and retrieved by the following process. Referring to FIG. 4, the signal samples from the front end hardware 12, stored in memory 20 and denoted as r(n), are demodulated to baseband by the improved demodulator 34, although the methods disclosed herein could be applied to an IF signal as well. The incoming signal samples of the IF signal are input to the improved demodulator 34 that first processes the signal samples in a first processing channel 70 to estimate the carrier phase, symbol timing frequency and phase offsets, gain factor, pilot amplitude, and equalizer coefficients. For the same IF record of data the demodulator 34 uses the carrier phase value to down convert 72 the IF signal to base band signal samples $r_{dc}(n)$, which are stored in memory 20. The baseband signal samples are passed through a digital filter 74 having combined filter coefficients 76 producing a filter response of the transmission system receiver filter, which in the preferred embodiment is a root raised cosine filter, and compensation for linear distortions introduced by the hardware of the front end circuitry 12 to produce filtered signal samples $r_{mf}(n)$. A symbol timing synchronizer 78 estimates timing phase and rate offset parameters using the down converted signal samples $r_{dc}(n)$ and the combined filter coefficients 76. The parameters are applied to a resampling filter that filters the filtered signal samples $r_{mf}(n)$ to time align the resampled signal samples $r_{ta}(n)$ so every fourth sample falls at a symbol instance. A signal scaling and pilot level remover 80 receives the filtered, time-aligned signal samples $r_{ta}(n)$ and determines a scaling factor and pilot level that are used to scale the filtered, time-aligned signal samples and remove the pilot level from the signal samples $r_{bb}(n)$, which are stored in memory 20. The filtered, time-aligned, scaled signal samples $r_{bb}(n)$ in memory 20 are output from channel 70 as unequalized filtered signal samples at four samples per 8-VSB symbol time (Tsymb/4). Alternatively, the filtered, time-aligned, scaled signal samples may be passed through a down sampler 81 to produce unequalized filtered signal samples $r_{bb}(n)$ at two samples per symbol time (Tsymb/2) or samples at symbol time (Tsymb). An equalizer 82 receives the filtered, time-aligned, scaled signal samples $r_{bb}(n)$ and calculates equalizer coefficients that are applied to an equalization filter within the equalizer to produce filtered, time-aligned, scaled, equalized signal samples $r_{eq}(n)$ that are free of linear errors. The filtered, time-aligned, scaled, equalized signal samples $r_{eq}(n)$ from the first processing channel 70 are output from the demodulator 34 as filtered signal samples at four samples per 8-VSB symbol time (Tsymb/4). Alternatively, the filtered, time-aligned, scaled, equalized signal samples may be passed through a down sampler 83 to produce filtered signal samples at two samples per symbol time (Tsymb/2) or samples at symbol time (Tsymb).

The second processing channel 84 of the improved demodulator 34 receives the down converted baseband signal samples $r_{dc}(n)$ from memory 20. A compensation filter 86 receives the down converted signal samples and the coefficients that compensate for the linear distortion introduced by the front end hardware circuitry. The output of the compensation filter are compensated signal samples $u_c(n)$. A resampling filter 88 receives the compensated signal samples $u_c(n)$ from memory 20 and the timing phase and rate offset parameters from the symbol timing synchronizer 78 and produces compensated, time-aligned signal samples $u_{ta}(n)$. A scalar 90 receives the compensated, time-aligned signal samples $u_{ta}(n)$ from memory 20 and the scaling factor from the pilot level estimator 80 and produces compensated, time-aligned, scaled signal samples $u_{bb}(n)$. An equalization filter 92 receives the compensated, time-aligned, scaled signal samples $u_{bb}(n)$ from memory 20 and the equalizer coefficients from the equalizer 82 and produces compensated, time-aligned, scaled, equalized signal samples $u_{eq}(n)$ that are linear error-corrected. The compensated, time-aligned, scaled, equalized signal samples $u_{eq}(n)$ from the second processing channel 84 are output from the demodulator 34 as unfiltered signal samples at four samples per 8-VSB symbol time (Tsymb/4). Alternatively, the compensated time-aligned, scaled, equalized signal samples may be passed through a down sampler 93 to produce unfiltered signal samples at two samples per symbol time (Tsymb/2) or samples at symbol time (Tsymb). Note, the signal samples from the second processing channel 84 are demodulated and equalized without the transmission system's receiver filter 74. This is due to the fact that phase noise is a nonlinear function which changes the signal power spectrum and causes spectrum spreading. The receiver shaping filter 74 changes the spectrum of an in-band signal, and therefore, change the phase noise characteristics.

The down converter 72, in addition to down converting the IF signal to baseband signal samples, estimates the phase of the pilot signal or sinusoid at the IF carrier. The method estimates the phase of a sinusoid (pilot signal), which is a part of a "compound" signal consisting of the pilot signal and a noise like signal component (8-VSB modulation data). The phase estimation method assumes a fixed, integral M relationship between the sinusoid frequency and the frequency of a sampling signal, with $M \geq 2$ samples of the compound signal available per sinusoid period. Additionally, the noise like signal component is zero-mean so that summing a large number of compound signal samples taken at sample instances with identical sinusoid phase will converge toward an integer multiple of the sinusoid value at that phase. The noise like signal component may be any type of analog or digital signal amplitude modulating the IF signal.

Figure 5:
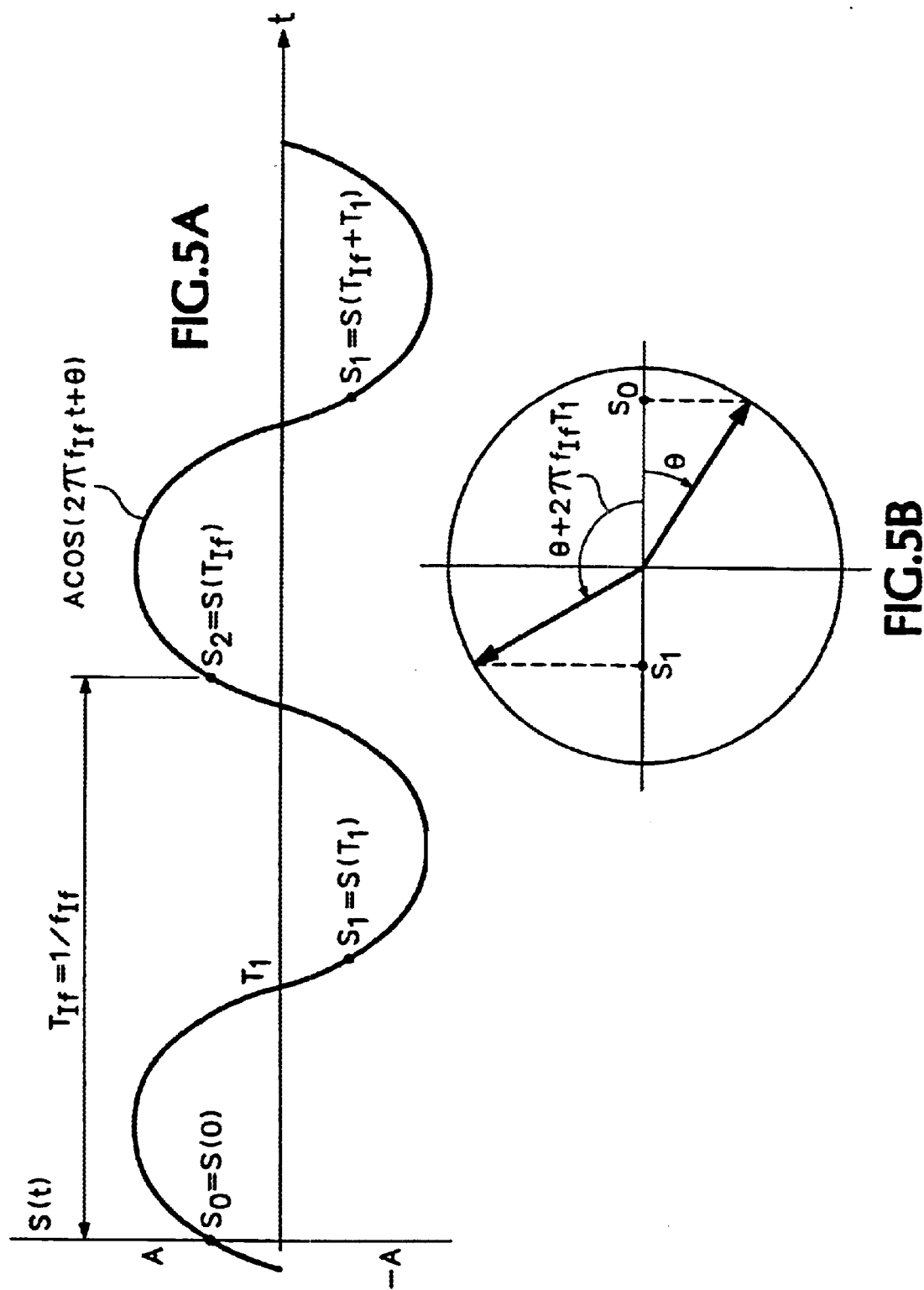
FIGS. 5A and 5B respectively illustrate a graphical representation of a sinusoid and a corresponding vector diagram for explaining the phase estimation process in the down converter of the measurement receiver demodulator according to the present invention.

FIGS. 5A and 5B respectively illustrate a graphical representation of a sinusoid and a corresponding vector diagram for explaining the phase estimation method. The sinusoid in FIG. 5A shows two samples of the sinusoid being acquired per cycle as is represented by $s_0$ and $s_1$. Samples $s_0$ and $s_1$ can be described trigonometrically as:

$$s_0 = A\cos\theta \quad (1)$$

$$\begin{aligned} s_1 &= A\cos(\theta + 2\pi f_{IF} t_1) \\ &= A\sin\left(\theta + 2\pi f_{IF} t_1 + \frac{\pi}{2}\right) \\ &= A\sin(\theta + \phi) \\ &= A[\sin\theta\cos\phi + \cos\theta\sin\phi] \end{aligned} \quad (2)$$

$$\frac{s_1}{s_0} = \frac{A[\sin\theta\cos\phi + \cos\theta\sin\phi]}{A\cos\theta} \quad (3)$$
$$= (\tan\theta)(\cos\phi) + \sin\phi$$

$$\theta = \tan^{-1}\left[\frac{\frac{s_1}{s_0} - \sin\phi}{\cos\phi}\right] \quad (4)$$

where $$\phi = 2\pi\left(f_{IF} t_1 + \frac{1}{4}\right)$$

is a constant

In a general sense, samples $s_0$ and $s_1$ may be acquired at any arbitrary point in the cycle. However, if $\theta$ is equal to $\pm 90°$, then $s_0$ equals 0 or for $t_1$ equals $T_{IF}/2$, which equals $1/2f_{IF}$, then $\cos\phi$ equals 0 and the solution for $\theta$ becomes indeterminate. Further, the solution for $\theta$ may require an adjustment of 180° due to the ambiguity of the arctangent function.

Equation 4 may be simplified by acquiring the samples $s_0$ and $s_1$, at t and $t+\frac{1}{4} T_{IF}$ (i.e. 90° apart).

$$\text{If } t_1 = \frac{T_{IF}}{4} = \frac{1}{4f_{IF}}, \phi = 2\pi\left(\frac{1}{2}\right) = \pi$$

$$\theta = \tan^{-1}\left(\frac{\frac{s_1}{s_0} - 0}{-1}\right) \quad (5)$$

$$\theta = \tan^{-1}\left(-\frac{s_1}{s_0}\right) \quad (6)$$

For a compound signal with a sinusoid s(t) and noise like zero mean signal n(t):

$$r(t) = A\cos(2\pi f_{IF} t + \theta) + n(t) \qquad (7)$$

$$S_0 = \sum_{k=0}^{N-1} r(kT_{IF}) \qquad (8)$$

$$= \sum_{k=0}^{N-1} A\cos(2\pi k + \theta) + \sum_{k=0}^{N-1} n(kT_{IF})$$

$$= \sum_{k=0}^{N-1} A\cos\theta + 0$$

$$= NA\cos\theta$$

likewise:

$$S_1 = \sum_{k=0}^{N-1} r\left(kT_{IF} + \frac{1}{4f_{IF}}\right) \qquad (9)$$

$$= \sum_{k=0}^{N-1} A\cos\left(2\pi k + \frac{\pi}{2} + \theta\right) + \sum_{k=0}^{N-1} n\left(kT_{IF} + \frac{1}{4f_{IF}}\right)$$

$$= \sum_{k=0}^{N-1} (-A\sin\theta) + 0$$

$$= -NA\sin\theta$$

$$\frac{S_1}{S_0} = \frac{-NA\sin\theta}{NA\cos\theta} = -\tan\theta \qquad (10)$$

$$\theta = \tan^{-1}\left(-\frac{S_1}{S_0}\right) = \tan^{-1}\left(-\frac{\sum_{k=0}^{N-1} r\left(kT_{IF} + \frac{1}{4f_{IF}}\right)}{\sum_{k=0}^{N-1} r(kT_{IF})}\right) \qquad (11)$$

Expanding on the basic trigonometric relationship between the sinusoid and the sampling signal, if four equal interval samples are acquired per cycle (M=4), then $t_1=1(4f_{IF})$, $t_2=1(2/f_{IF})$, $t_3=3/(4f_{IF})$.

$$s_0 = A\cos\theta \qquad (12)$$

$$s_1 = A\cos(\theta + 2\pi f_{IF} t_1) = -A\sin\theta \qquad (13)$$

$$s_2 = A\cos(\theta + 2\pi f_{IF} t_2) = -A\cos\theta \qquad (14)$$

$$s_3 = A\cos(\theta + 2\pi f_{IF} t_3) = -A\sin\theta \qquad (15)$$

$$s_0 - s_2 = A\cos\theta - (-A\cos\theta) = 2A\cos\theta \qquad (16)$$

$$s_3 - s_1 = A\sin\theta - (-A\sin\theta) = 2A\sin\theta \qquad (17)$$

$$\frac{s_3 - s_1}{s_0 - s_2} = \frac{2A\sin\theta}{2A\cos\theta} = \tan\theta \qquad (18)$$

$$\theta = \tan^{-1}\left(\frac{s_3 - s_1}{s_0 - s_2}\right) \qquad (19)$$

For a compound signal with a sinusoid and noise like zero mean signal:

$$\theta = \tan^{-1}\left[\frac{\sum_{k=0}^{N-1} r\left(\left(k+\frac{3}{4}\right)T_{IF}\right) - \sum_{k=0}^{N-1} r\left(\left(k+\frac{1}{4}\right)T_{IF}\right)}{\sum_{k=0}^{N-1} r(kT_{IF}) - \sum_{k=0}^{N-1} r\left(\left(k+\frac{1}{2}\right)T_{IF}\right)}\right] \qquad (20)$$

The signal samples representing the IF signal are real valued samples that may be viewed as real component values of a spinning complex vector representing the IF signal. Such a vector may be viewed in vector space having real and imaginary components. Viewing the digitally modulated IF signal on a graph with a horizontal real I axis and a vertical imaginary Q axis, there would be a spinning vector at the IF frequency generating a cloud of data points representing the signal samples of the digitally modulated IF signal. To obtain useful information from this cloud of points, the IF signal needs to be down converted to baseband by removing the IF carrier, and demodulated for correct timing and phase. If the IF pilot is in phase with the local oscillator phase then the down conversion and demodulation operations place the symbol data in the regions of the eight levels along the horizontal real or I axis producing a series of vertically aligned clouds of data points along the imaginary or Q axis called a constellation display. The demodulation operation includes passing the down converted signal samples through a root raised cosine receiver filter to obtain the 8 discrete levels. However, if the IF pilot tone is not in phase with the local oscillator then the real axis of the constellation display is angled away from the horizontal axis by the phase difference between the IF pilot tone and the local oscillator phase. This produces a constellation display where the vertically aligned clouds of data points are angled from the horizontal I axis.

Figure 6:
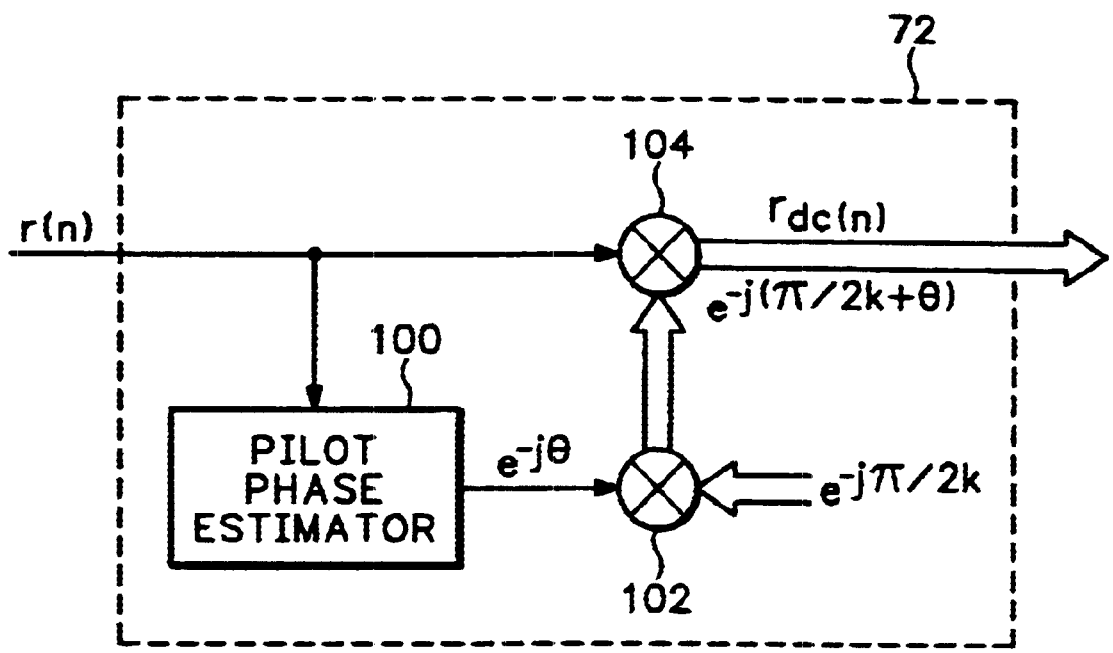
FIG. 6 is a representative block diagram illustrating the down converter in the measurement receiver demodulator according to the present invention.

Referring to FIG. 6, there is shown a representative block diagram of the down converter 72 generating the baseband signal samples and estimating the phase of the pilot signal. The elements shown in FIG. 6 represent processes performed on the stored signal samples representing the digitized IF signal. A block of signal samples from memory 20 representing the IF signal r(n) is processed through the pilot phase estimator 100 for determining the phase of the pilot tone or IF carrier. The block of signal samples is sufficient to perform narrow band filtering around the pilot signal and remove undesired digital modulation data for this process. The resultant phase value is combined with counter-rotating vector values in mixer 102 and applied to a complex mixer 104 for down converting the IF signal r(n) to baseband complex data values $r_{dc}(n)$.

The phase estimation method takes advantage of the pilot signal being at one-fourth of the sampling frequency in the preferred embodiment. A Least-Squares based derivation of the phase estimation method shows that the method is optimal in the least square error sense. The pilot signal inside an 8-VSB signal can be expressed as the following where $f_c$ is equal to the carrier frequency normalized with respect to the sample frequency:

$$r(n) = A\cos(2\pi f_c n + \theta) + s(n) \qquad (21)$$

$$= A\cos(2\pi f_c n)\cos(\theta) - A\sin(2\pi f_c n)\sin(\theta) + s(n) \qquad (22)$$

where $s(n)=s_i(n)\cos(2\pi f_c n+\theta)-s_q(n)\sin(2\pi f_c n+\theta)+V(n)$ (23)

and s(n) is the noise-like 8-VSB signal and V(n) is additive white Gaussian noise, both of which are zero mean random variables that sum to zero over many samples. The in-phase and quadrature components (cos θ, sin θ) can be linearly modeled and optimally estimated in a Least-Squares sense, as shown below.

$$R = D\Phi \qquad (24)$$

where $R=[r(0), r(1), \ldots, r(n-1)]^T$ (25)

$$\Phi = [A\cos(\theta), A\sin(\theta)]^T \qquad (26)$$

$$D = \begin{bmatrix} \cos(2\pi f_c 0) & -\sin(2\pi f_c 0) \\ \cos(2\pi f_c 1) & -\sin(2\pi f_c 1) \\ \vdots & \vdots \\ \cos(2\pi f_c(n-1)) & -\sin(2\pi f_c(n-1)) \end{bmatrix} \quad (27)$$

$$\Phi = (D^T D)^{-1} D^T R \quad (28)$$

Since the normalized pilot frequency is one-fourth the sampling rate ($f_c \frac{1}{4}$), the phase calculation can be simplified as:

$$D^T = \begin{bmatrix} 1 & 0 & -1 & 0 & 1 & 0 & -1 & 0 & \ldots & 1 & 0 & -1 & 0 \\ 0 & -1 & 0 & 1 & 0 & -1 & 0 & 1 & \ldots & 0 & -1 & 0 & 1 \end{bmatrix} \quad (29)$$

$$(D^T D)^{-1} D^T = \frac{2}{N} D^T \quad (30)$$

$$\Phi = \quad (31)$$

$$\frac{2}{N} \begin{bmatrix} 1 & 0 & -1 & 0 & 1 & 0 & -1 & 0 & \ldots & 1 & 0 & -1 & 0 \\ 0 & -1 & 0 & 1 & 0 & -1 & 0 & 1 & \ldots & 0 & -1 & 0 & 1 \end{bmatrix} \begin{bmatrix} r(0) \\ r(1) \\ \vdots \\ r(n-1) \end{bmatrix}$$

$$\theta = \tan^{-1} \left( \frac{\sum_{k=0}^{\frac{n}{4}} r(4k+3) - \sum_{k=0}^{\frac{n}{4}} r(4k+1)}{\sum_{k=0}^{\frac{n}{4}} r(4k) - \sum_{k=0}^{\frac{n}{4}} r(4k+2)} \right) \quad (32)$$

The terms r(4k), r(4k+1), r(4k+2), and r(4k+3) represent the signal samples at the sample locations on the pilot signal that are sequentially 90° apart from each other. The numerator of the equation 29 represents sin θ and the denominator represents cos θ. Since the sample locations are 90° apart, the cos θ values at r(4k+2) are 180° from the cos θ values at r(4k) allowing the summed values of r(4k+2) to be subtracted from the summed values of r(4k). This process essentially averages the two sets of values at the r(4k) and r(4k+2) sample locations. Likewise, the sin θ values at r(4k+1) are 180° from the sin θ values r(4k+3) allowing the summed values at r(4k+1) to be subtracted from the summed values of r(4k+3). This process essentially averages the two sets of values at the r(4k+3) and r(4k+1) sample locations. In the actual implementation of the phase estimation method, the signs of the r(4k+1) and r(4k+2) values are reversed and summed with the r(4k+3) and r(4k) values resulting in two sets of data values representing sin θ and cos θ. Since the data contains the zero mean modulation data and the pilot signal, the summation of the data values achieves, by simple addition, a narrow band filtering function at the pilot signal frequency.

Figure 7:
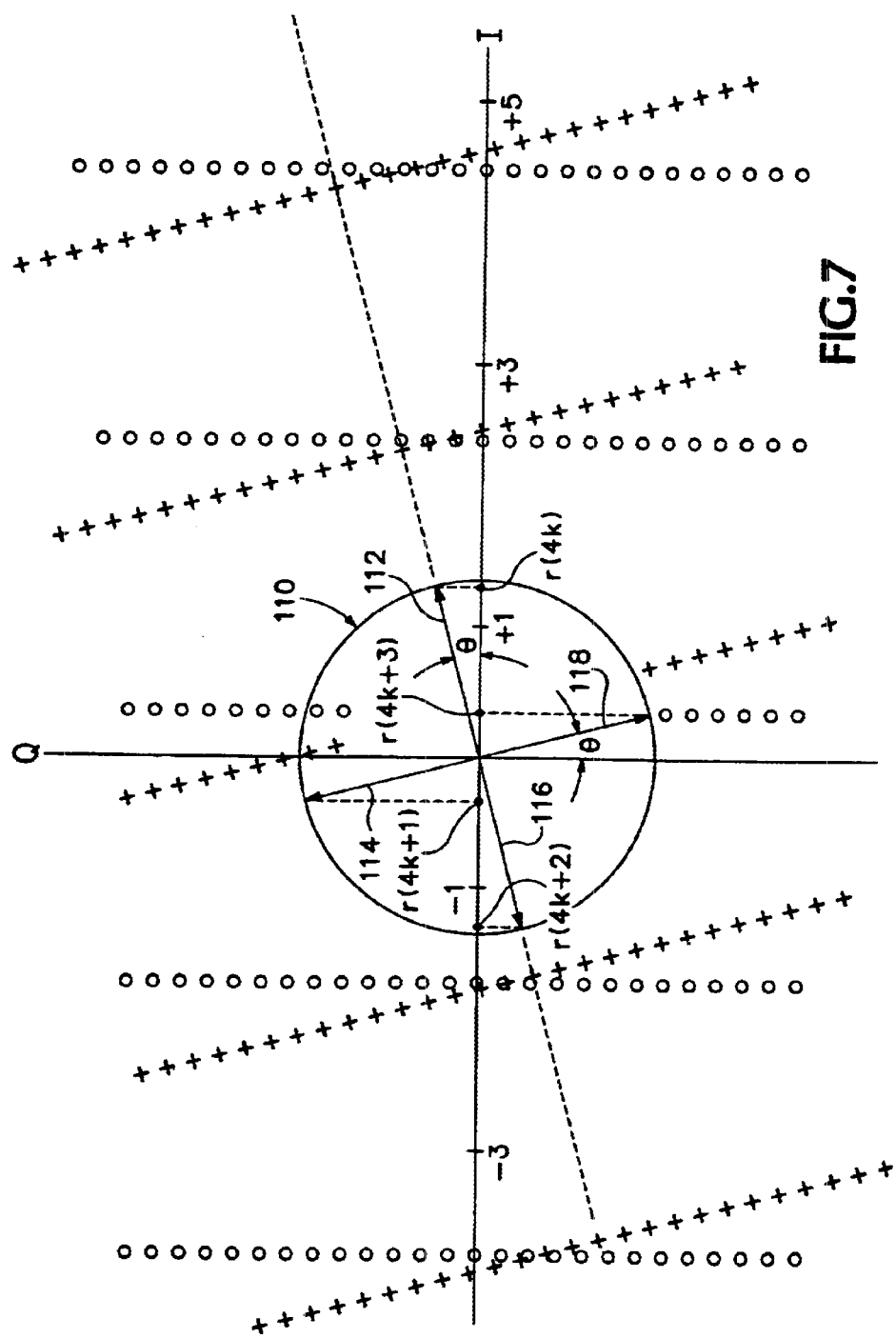
FIG. 7 is a graphical representation of the constellation diagram with a pilot signal vector diagram showing the relationships associated with estimating the pilot signal phase in the measurement receiver demodulator according to the present invention.

Referring to FIG. 7, there is shown a partial representative view of a constellation display of symbol data with a pilot signal and the relationship of the pilot signal to the local oscillator signal as represented by a vector diagram 110. In the drawing, the symbol data is shown as offset by the pilot level. The vertically positioned constellation display, shown by the "o" symbol, represents a correct constellation display. The angularly positioned constellation display, shown by the "+" symbol represents a constellation display having an angular offset caused by the phase between the IF carrier signal and the local oscillator signal. As represented in the diagram, the local oscillator is not in phase with the pilot tone producing a phase θ. The vector diagram 110 represents the pilot signal at the IF carrier. The pilot signal may be viewed as a vector spinning at the carrier frequency with samples being taken at 90° intervals as represented by vector positions 112, 114, 116 and 118. Since the pilot is a real signal, the data samples fall along the horizontal or I axis at r(4k), r(4k+1), r(4k+2), and r(4k+3). A block of digital data from memory 20 is processed producing the summed sets of data points at r(4k), r(4k+1), r(4k+2), and r(4k+3). As previously described, the summed r(4k+2) data is combined with the summed r(4k) data and the summed r(4k+1) data is combined with the summed r(4k+3) data producing combined data sets at r(4k) and r(4k+3). The r(4k) data set represents the cosine of θ and the r(4k+3) data set represents the sine of θ. Using the trigonometric relationship for arc-tangent, the r(4k) and r(4k+3) data sets are used for determining the phase θ between the pilot signal and the local oscillator for down conversion.

It should be noted that the sampling process may start at any arbitrary time and that first acquired signal sample may occur in any one of the four quadrants represented in the phase diagram 110. Whatever the starting point of the acquisition, the first acquired data point is defined as r(4k) with the subsequent data points being sequentially defined as r(4k+1), r(4k+2), and r(4k+3). Because the pilot signal is being sampled at 90° intervals, the sets of data points will always define the cosine and sine values for θ.

The pilot phase is applied to the complex mix process 104 to down convert the IF signal values r(n) to baseband complex signal $r_{dc}(n)$. The IF carrier may be viewed as a counter-clockwise spinning vector having a real-axis magnitude equal to the acquired sampled values. A complex multiplication is performed on each of the acquired sample points using a counter-rotating clockwise vector spinning at the same rate as the IF carrier and having the estimated phase. The result of this complex multiplication process is to align the symbol data along the horizontal real or I axis. Further processing will time align the data samples for timing synchronization in the acquisition system, perform equalization and regeneration of the Q channel signal for each of the data samples, remove the pilot and scale the data for generating the constellation and other displays.

Figure 8A:
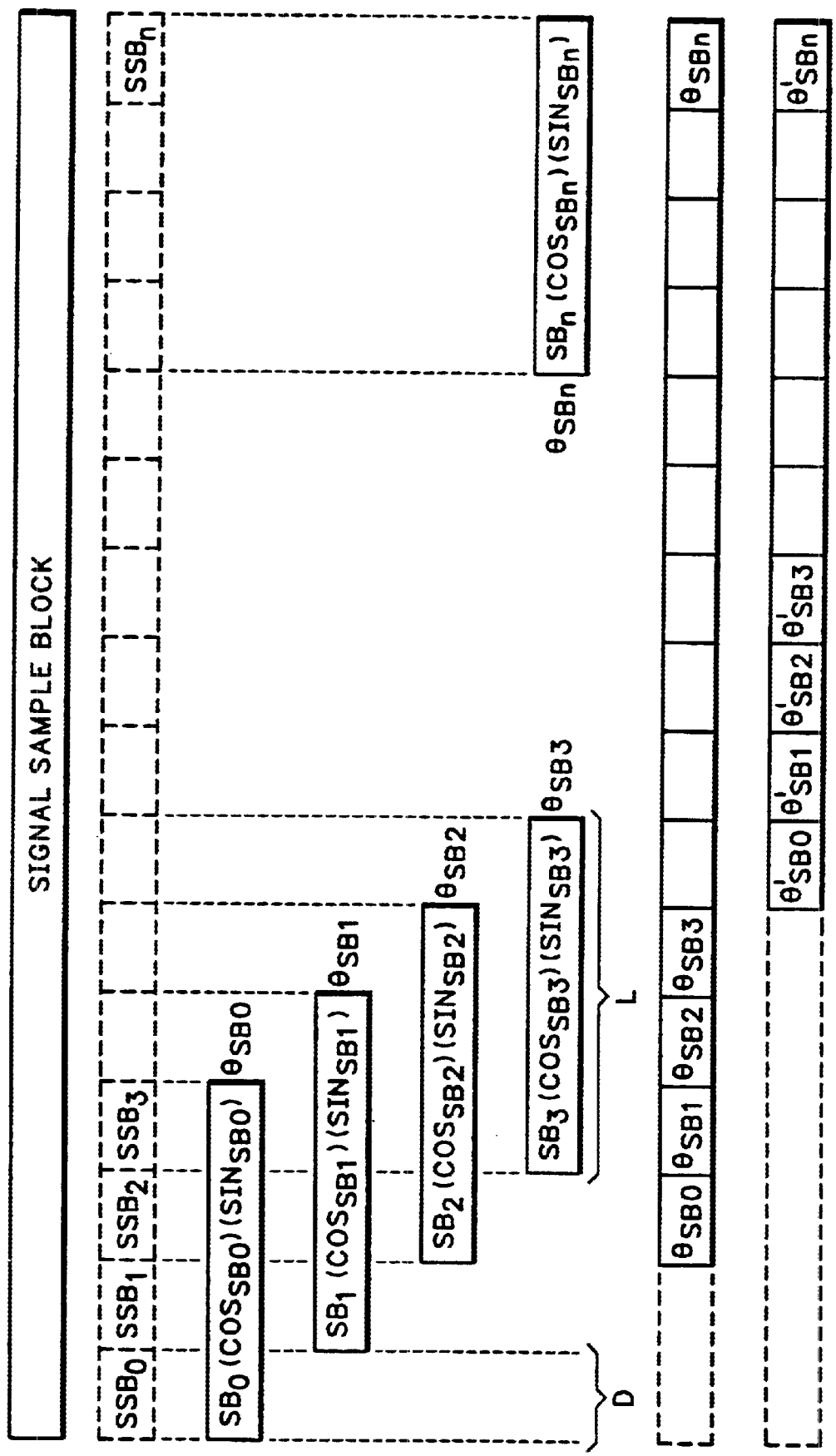
FIGS. 8A and 8B are illustrative of a decimation process associated with estimating the pilot signal phase in the measurement receiver demodulator according to the present invention.

In one implementation of the present invention, a block of acquired signal samples are used to determine the pilot phase or equivalently the IF carrier phase. The assumption is that the pilot phase is constant for all of the acquired data. However, due to phase noise in the transmitter or in the instrumentation receiver, this constant phase assumption may be invalid. This produces what best can be described as a "Hula" effect in the constellation display. The effect manifests itself as periodic rotations of the constellation display around the origin as a function of the phase drift. This effect is compensated in the commercialized implementation of the present invention by processing sub-blocks of the block of signal samples for estimating the pilot signal phase within the sub-blocks of samples and performing the complex multiplication mixing of portions of the samples in the sub-blocks with the estimated phase for that sub-block as illustrated in FIGS. 8A and 8B.

Figure 8B:
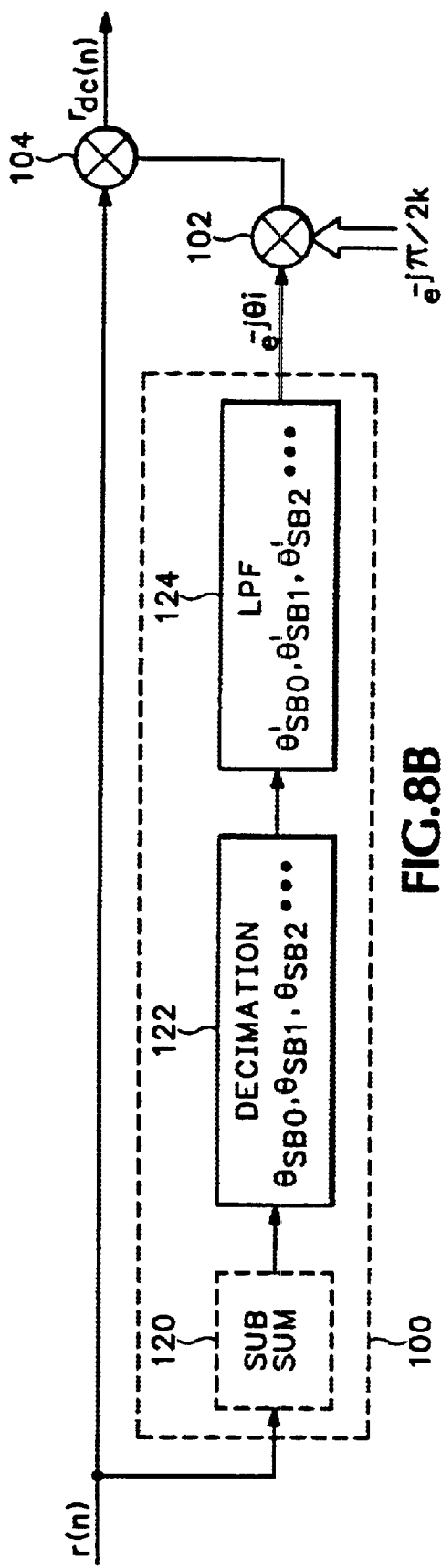

The process includes a decimation process 122 and a low pass filter 124 process as shown in FIG. 8B. The decimation process is illustrated in FIG. 8A. The signal sample block is divided into sub-blocks labeled $SB_0$, $SB_1$, $SB_2$, $SB_3$ ... $SB_n$, where D is the decimation ratio equal to an integer multiple of 4 ($4m_1$,) and L is the sub-block length and is equal to an integer multiple of the decimation ratio ($m_2$, D). In the preferred embodiment of the invention, the D is equal to 320 signal samples and L is equal to 4800 signal samples and L/D is equal to 15. The signal samples within each of the sub-blocks are summed in an addition process for removing the modulation data to generate sine and cosine values representative of vector locations of the pilot signal as shown in the following equations.

$$\cos_{SB}\theta = \sum_{k=0}^{L-1} r(4k) - \sum_{k=0}^{L-1} r(4k+2) \qquad (33)$$

$$\sin_{SB}\theta = \sum_{k=0}^{L-1} r(4k+3) - \sum_{k=0}^{L-1} r(4k+1) \qquad (34)$$

The pilot signal phase θ over each of the sub-blocks of data is determined using the sine and cosine values $\cos_{SB}\theta$ and $\sin_{SB}\theta$.

$$\theta_{SB} = \tan^{-1}\left(\frac{\sin_{SB}\theta}{\cos_{SB}\theta}\right) \qquad (35)$$

The pilot phase estimations $\theta_{SB0}, \theta_{SB1}, \theta_{SB2}, \theta_{SB3} \ldots \theta_{SBn}$, are passed through a low pass filter 124 filter having sufficient bandwidth to pass the phase variations of the local oscillator 50 but narrow enough to block the digital signal data. In the preferred embodiment the low pass filter has a 3 dB bandwidth of 1 KHZ.

$$\theta'_{SB} = h_{LPF}(x)\theta_{SB} \qquad (36)$$

The resultant phase values, $\theta'_{SB0}, \theta'_{SB1}, \theta'_{SB2}, \theta'_{SB3} \ldots \theta'_{SBn}$, which have an initial delay due to the decimation and filtering processes, are combined with counter-rotating vector values in mixer 102 and applied to the complex mixer 104 for down converting the IF signal r(n) to baseband complex data values $r_{dc}(n)$.

For computational efficiency in the preferred embodiment, the sub-blocks are divided into further sub-sum blocks 120 labeled $SSB_0, SSB_1, SSB_2, SSB_3, SSB_4, \ldots SSB_n$. The sin θ numerator summation value and cos θ denominator summation value of equations 33 and 34 are determined for each sub-sum block. The sin θ and cos θ values of the sub-sum blocks covering the respective sub-blocks are added together to produce the sin θ and cos θ values for the respective sub-blocks. Equation 32 is applied to the summed sin θ and cos θ values for estimating the pilot signal phase θ over the sub-blocks. The resultant pilot signal phase estimation output θ of the low pass filter 124 may be linearly interpolated to provide additional pilot signal phase estimation values between the values calculated using equation 32.

The baseband signal samples at the output of the down converter 72 are stored in memory 20 for further processing by the transmission system receiver filter and compensation filter 74. A typical receiver usually has a calibration filter to correct for linear distortions that may exist in the front end hardware 12. Such a filter can be realized in either software or hardware. A software based calibration filter is more flexible and economic to implement but could slow down the demodulation process if designed as a separate filter. In the present invention, the calibration filter is embedded with the transmission system receiver filter, which requires no additional processing power. The design combines the 8-VSB root-raised cosine (RRC) filter with the calibration filter without increasing the length of the RRC filter. Such a design is based on the assumption of moderate internal linear distortion and a certain degree of freedom of the receiver filter. A 129-tap RRC filter is used in the demodulator 34. The filter is optimized in the sense of minimum intersymbol interference (ISI) and yields a greater than 55 dB signal-to-noise ratio for a perfect channel, and about the same signal-to-noise ratio if also acting as a calibration filter for a channel with a 4 dB peak-to-peak amplitude variation and about 5 ns peak-to-peak group delay variation. Therefore, a 129-tap FIR filter has enough potential for performing both signal shaping and calibration.

Referring to FIG. 9, the RRC receiver/calibration combined filter 74 is designed using a reference 8-VSB signal source 128. The reference signal generator 128 uses a known pseudo-random (PN) sequence to generate an ideally transmitted 8-VSB signal that is input to the measurement receiver 10. The input signal is down converted to an IF signal by the front end hardware, digitized and stored in memory 20. The IF signal samples are down converted to baseband by the down converter 72 as previously described and resampled using timing and phase rate offset parameters produced by the symbol timing synchronizer and resampling process 78 to be described in greater detail below. The receiver/calibration filter is initialized as a standard ATSC-8-VSB RRC filter with 129 taps. The optimal filter coefficients (in the sense of minimum ISI) are generated by a data-aided adaptive procedure utilizing the Stochastic Gradient update method and a fixed training sequence. After calibration, the filter coefficients are stored in non-volatile memory, as represented by the receiver filter and compensation coefficients block 76 and the filter will be fixed during normal demodulation processing. It should be noted that separate filter coefficients for the calibration filter are also stored in memory for use in the second processing channel. 84.

Figure 10:
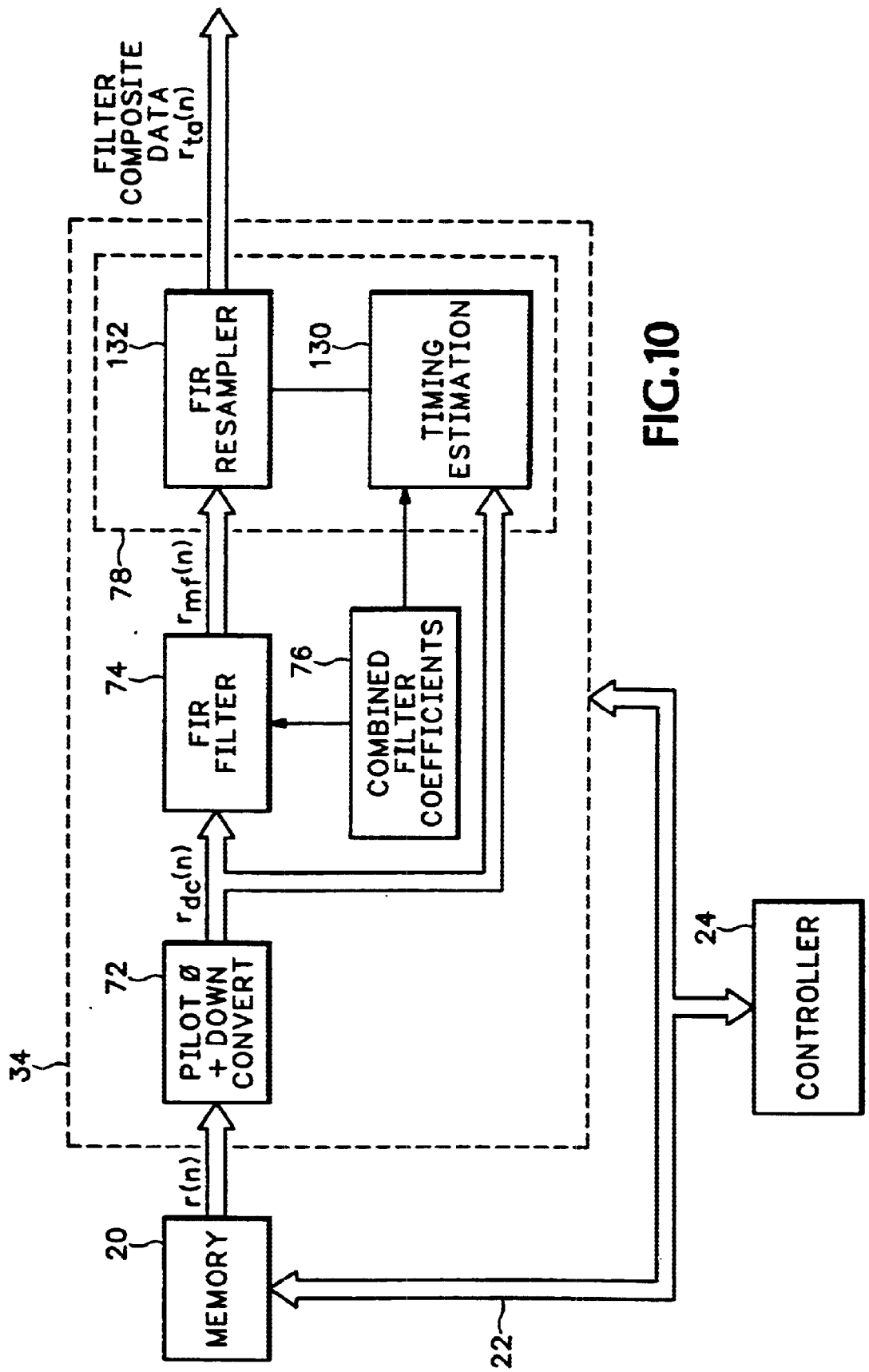
FIG. 10 is a block diagram illustrating the symbol timing synchronizer and resampler incorporated in the measurement receiver demodulator according to the present invention.

Referring to FIG. 10, the block of baseband signal samples stored in memory is processed by the timing estimation process 130 that generates timing phase and rate offset values. The timing and rate offset values are applied to a FIR resampling filter 132. The baseband signal samples set $r_{dc}(n)$ is filtered by FIR filter implementing the transmission system's receiver filter and compensation filter 74 to produce filtered signal samples $r_{mf}(n)$. The time estimation process 130 and the FIR filter 74 receive filter coefficients 76 that correspond to frequency domain response of a root raised cosine function with compensation for linear magnitude and phase deviations of the receiver front end hardware. The output of the FIR resampling filter 132 is signal samples $r_{ta}(n)$ that are time aligned to the symbol timing.

In the preferred embodiment of the present invention, the input to the timing estimation process 130 consists of complex signal samples (I+jQ) at a nominal rate of four times the symbol rate. It is assumed that the signal samples are at 0 Hz IF (i.e. baseband samples) and that the in-phase or data-bearing component of the signal is contained in the real part of the complex signal samples. The sampling instance may be at any arbitrary timing phase within the symbol interval (phase offset) and may slew with respect to symbol timing across the data set by several samples (rate offset). Additionally, the signal samples need to contain properly spaced Data Segment Sync (DSS) sequences as defined in the ATSC specification. The data block length needs to be large enough to contain several segment sync sequences within the block of signal samples to be processed. The block of signal samples used in the commercial implementation of the present invention has approximately 73,000 samples spanning 22 segment sync sequences. The number of segment sync sequences contained in the block of signal samples was arbitrarily chosen for good performance and reasonable throughput and a smaller or a larger number of segment syncs may be chosen without departing from the scope of the appended claims so long as the number chosen provides sufficient samples for performing the timing phase and rate offset determinations.

An initial search for the positions of the segment sync sequences within the block of signal samples is performed. The search is a cross correlation of the real or "I" part of the signal samples, obtained before the receiver filter 74, having intersymbol interference as represented in FIG. 11A with a reference pattern of ideal segment sync sequences as is represented in FIG. 11B. The correlation runs through a delay window or range slightly larger than one data segment in signal sample increments to find a peak cross-correlation value and a lag index. In the preferred embodiment of the present invention, the correlation range equals 3,408 signal samples or 852 symbols. The cross-correlation process is represented by the following equation:

$$R_{rD}(\tau) = \sum_{n=0}^{N-1} \sum_{k=0}^{3} Re[r_{dc}(\tau + Sn + 4k)] \cdot DSS(k) \quad \tau = \tau_1, \quad (37)$$

$$\tau_1 + 1, \ldots \tau_1 + S + \tau_2$$

where $R_{rD}(\tau)$ is the cross-correlation at delay $\tau$, $\tau$ is the delay index in sample intervals, N is the number of segments within the block of signal samples, S is the expected number of samples between data segment sync sequences (4×832), r( ) is the received signal sample set, DSS( ) is the ideal 4-point segment sync sequence, $\tau_1$ is the initial delay index value, and $\tau_2$ is the number of additional sample intervals to extend the delay range beyond one segment length.

Referring to FIG. 11A, an initial starting or reference point $\tau_1$ 140 is set within the block of signal samples, represented by region labeled 142, as one-half of the length of the filter corresponding to the root raised cosine and correction response plus 40 digital data sampling points. The waveform of FIG. 11A shows the signal samples of the symbol sync sequences 144 having a distorted pattern caused by effects of intersymbol interference and other distortions in the system. With a sampling rate of four times the symbol rate, there are 3328 signal samples between the start of each symbol sync sequence 144. The correlation lag range starts at the initial value and covers a total of 3408 signal samples or 852 symbols. The reference pattern of FIG. 11B may be visualized as a sequence of 20 ideal symbol sync patterns 146 each having a +5, −5, −5, +5 symbol pattern and separated by 828 symbols or 3312 signal samples.

Figure 12A:
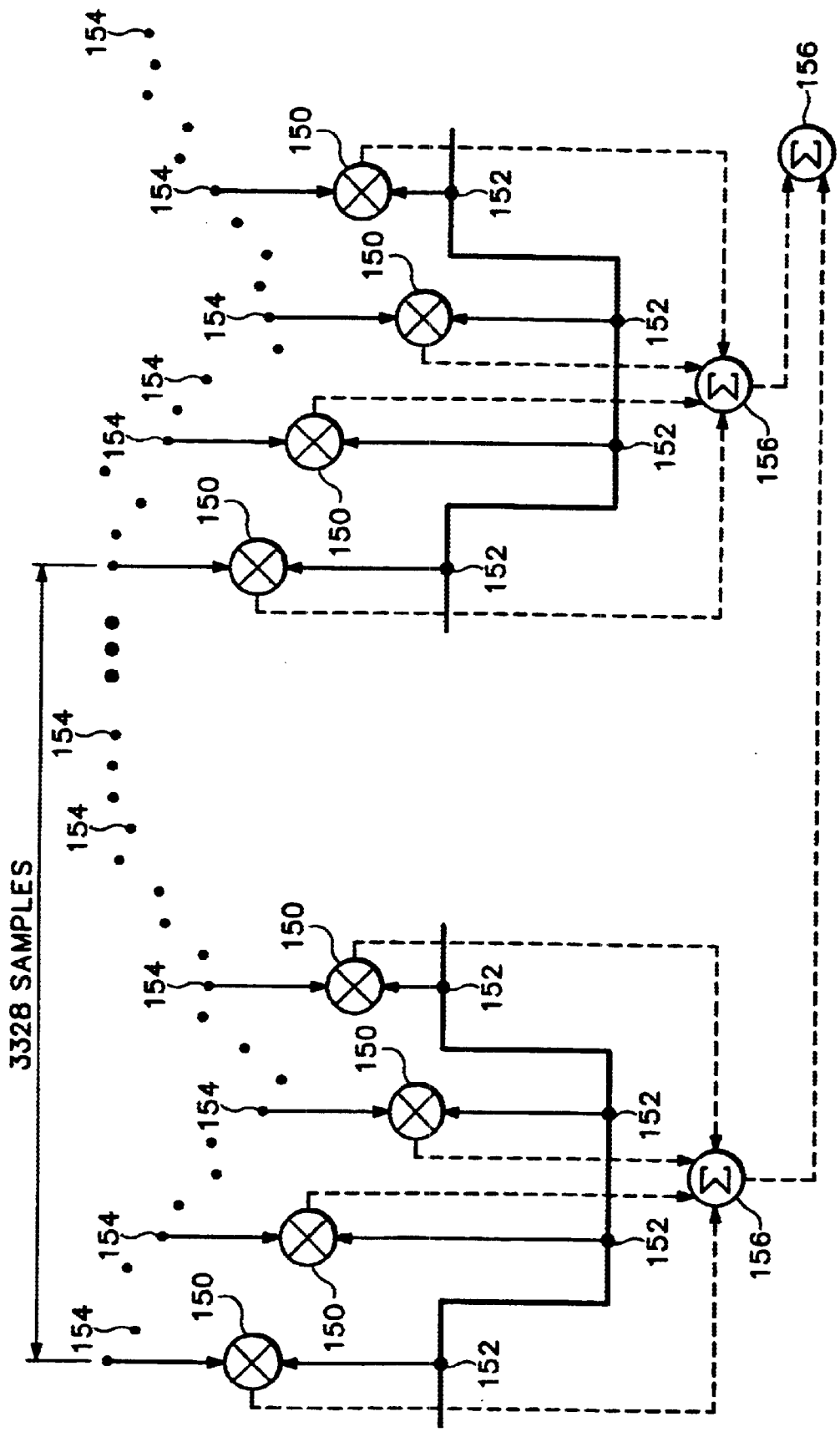

As representatively shown in FIG. 12A, the cross-correlation function is performed by multiplying 150 each reference symbol 152 of the symbol sync sequences of the reference pattern with a corresponding signal sample point 154 in the block of signal samples 142 and summing 156 the multiplied results for each sample point together to obtain a R(τ) value. This process is repeated for each signal sample point 154 in the correlation range set to produce a set of data having a correlation peak value when the reference pattern of ideal segment sync sequences 146 is aligned with the received segment sync sequences 144 in the block of signal samples 142. FIG. 12B is a graphical representation of the results of the cross-correlation function showing the cross-correlation peak 158. The location of the correlation peak is taken as the approximate position of the symbol sync sequences 144 in the block of signal samples 142. The lag index $\tau_{pk}$ of the peak correlation is the initial estimate of the timing phase of the symbol sync sequences within the block of signal samples.

$$\tau_{pk} = arg\left[\max_\tau \; R_{rD}(\tau)\right] \quad (38)$$

Knowing the starting point $\tau_1$ in the correlation range within the block of signal samples and the lag index of $\tau_{pk}$ along with a knowledge that the symbol sync sequence spacing is 3328 signal samples or 832 symbols, the approximate center locations of each of the symbol sync sequences 144 in the block of signal samples 142 are determined.

The cross-correlation process is performed in a computationally efficient manner by normalizing the reference pattern of ideal segment sync sequences to values of +1, −1, −1, +1. This results in simply inverting the signs of the middle two signal samples in the correlation process. This allows a straight forward summation of the samples without the need for performing the multiplication of the ideal pattern with the real signal samples.

The block of signal samples are reduced for further processing by establishing narrow subranges of signal samples corresponding to a few symbol intervals surrounding the peak correlation lag position $\tau_{pk}$ and subsequent segment spacings ($\tau_{pk}$+Sk) through the block of signal samples. Each subrange includes a symbol sync sequence 144 and a few symbol intervals around the sequence. In the preferred embodiment, there are 8 symbol intervals in each subrange equaling 32 signal samples. A complex filtering operation utilizing the transmission system's receiver filter (root raised cosine filter in the preferred embodiment) and compensation FIR filter coefficients $h_{MF}(n)$ 76 is applied to the signal sample subranges as shown by the below equation.

$$r_{MF}(k,n)=Re[r(S\cdot k+n+m)\otimes h_{MF}(m)] \quad (39)$$

$$k=(0,1, \ldots N-1), \; (\tau_{pk}-\delta)\leq n \leq (\tau_{pk}+\delta)$$

Using the subranges around the symbol sync sequence locations produces a reduction in the filtering requirements of approximately 100 to 1, since only about 8 of the 832 symbol intervals per segment need to be filtered by the transmission system's receiver filter. Also, only the real-part of the complex-data/complex-coefficient filter result is needed, which also reduces the filtering processing by half. The filtered signal samples are stored in a static buffer for reuse through the remainder of the timing estimation process. Appropriate compensation is made during the filtering process to account for the time delay of the filtering process to avoid shifting the cross-correlation peak.

The final steps in the timing estimation process consist of an iterative process to refine the timing phase and rate offsets based on the filtered subrange signal samples. The steps include repeatedly resampling the static buffer of filtered signal samples, and deriving an error quantity from the resampled signal samples which is used to drive the iteration process toward a minimum error, or deviation, from ideal symbol instances. During each iteration, the timing phase and rate offset values of the resampling process are modified to converge on the final values of the resampling timing phase and rate offset which cause the resampled signal to minimize the error measure. Resampling is performed over the subranges of filtered signal samples surrounding the symbol sync sequences. Resampling over the subranges significantly reduces the number of resampling operations as compared to resampling over the entire block of signal samples.

Figure 13A:
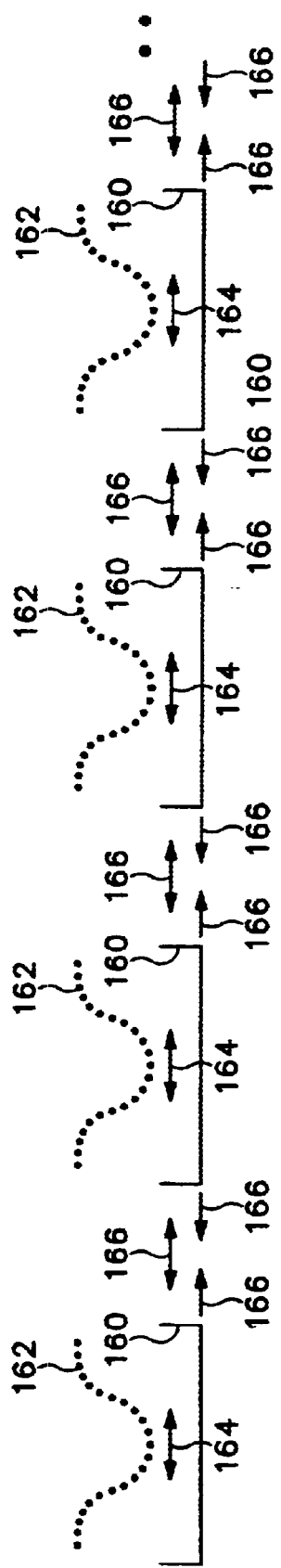
FIGS. 13A, 13B and 13C are respective representative diagrams of subranges containing filtered signal samples of the symbol sync sequences, a reference pattern of ideal symbol sync sequences and a reference pattern of quadrature symbol sync sequences used in the symbol timing synchronizer and resampler incorporated in the measurement receiver demodulator according to the present invention.
Figure 13B:
Figure 13C:

Referring to FIG. 13A, there is shown a representation of the filtered signal samples in subranges 160 containing the symbol sync sequences 162. The timing phase offset value may be viewed as varying the symbol sync sequences within the subranges as represented by arrowed lines 164. The timing rate offset value may be viewed as varying the subranges within the block of signal samples as represented by arrowed lines 166. The iteration process includes cross-correlation with the reference pattern of ideal symbol sync sequences 168, as represented in FIG. 13B to generate a correlation peak. A second cross-correlation is performed to generate an error curve by correlating the subrange signal samples with a reference waveform matching the subranges having a symbol sequence pattern 170 of −5, −5, +5, +5, as represented in FIG. 13C. This pattern has been referred to as representing a quadrature filter in 8-VSB literature and this nomenclature will be used for calling the pattern a quadrature segment sync (QSS) symbol pattern. The QSS cross-correlation produces an "S"-shaped error curve, with the zero-crossing of the S-curve at the optimum lag time for symbol timing. The goal of the iteration process is to use the error curve information to drive the timing phase offset toward a value which causes a resampling delay in the resampling filter to place the QSS cross-correlation zero crossing very near a sample point.

Figure 14A:
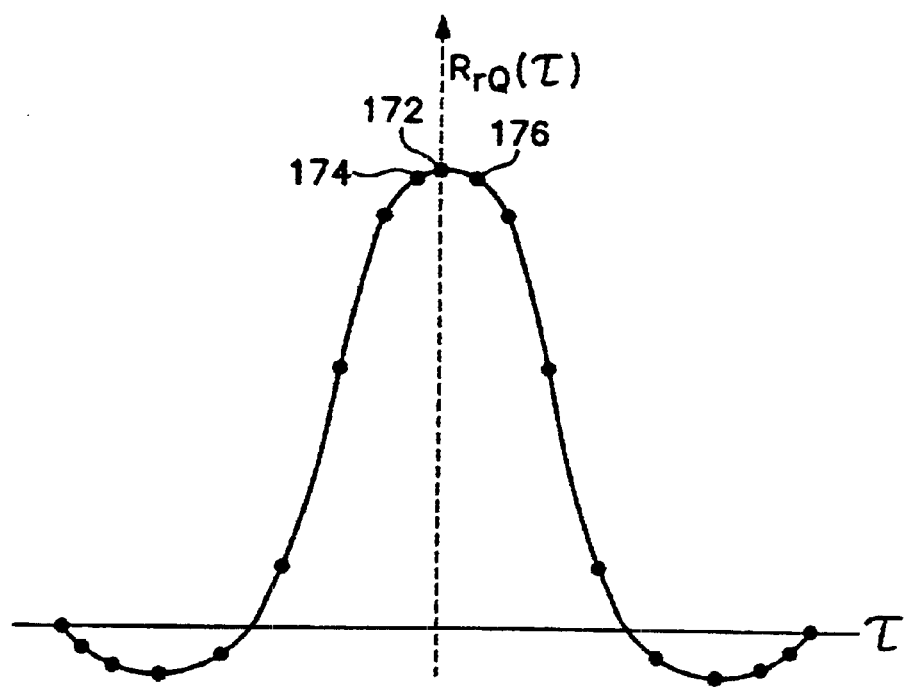
FIGS. 14A and 14B are respective representative diagrams of the cross-correlation results for estimating the timing phase offset in the symbol timing synchronizer and resampler incorporated in the measurement receiver demodulator according to the present invention.
Figure 14B:
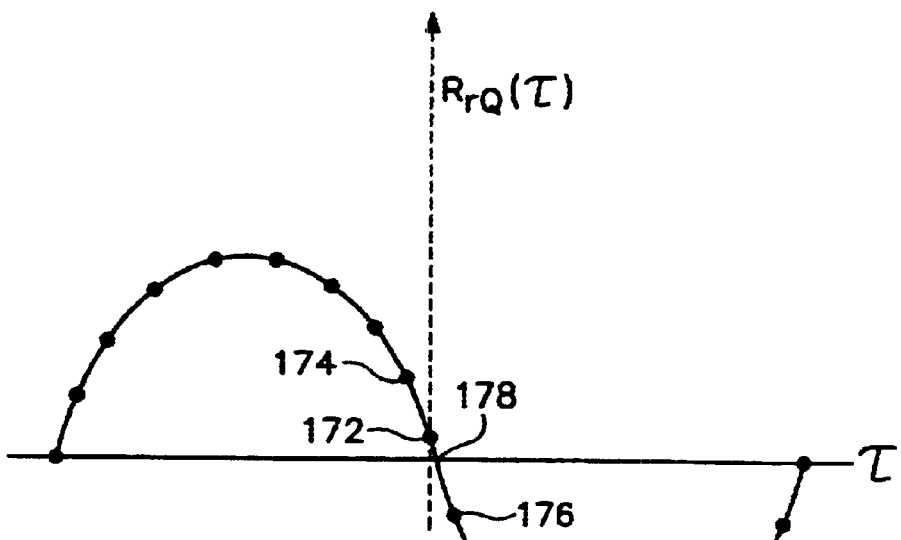
Figure 15:
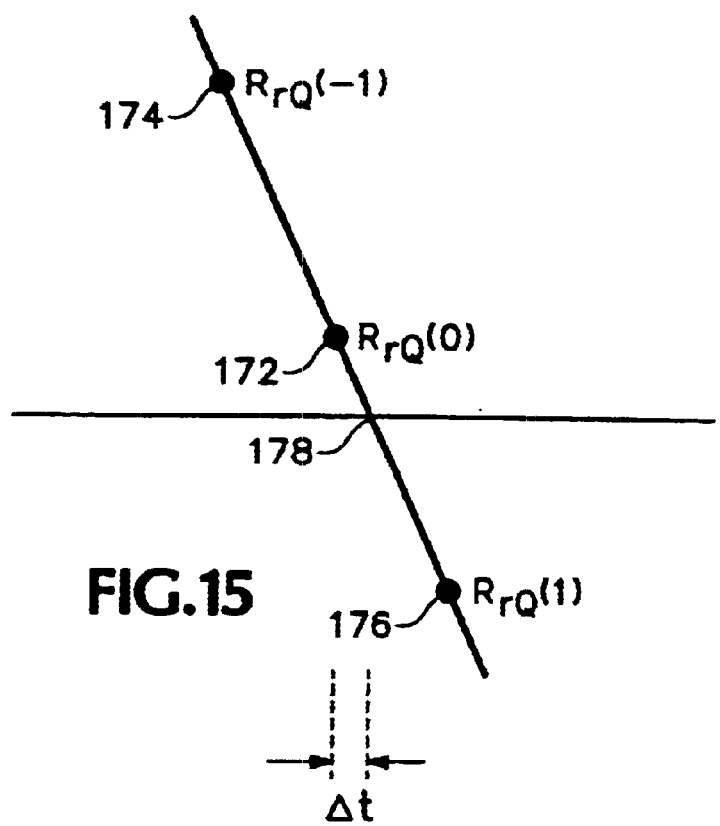
FIG. 15 is a graphical representation of the timing phase offset value generation process in the symbol timing synchronizer and resampler incorporated in the measurement receiver demodulator according to the present invention.

FIGS. 14A and 14B are representative waveform drawings of the respective cross-correlation results using the reference pattern of ideal symbol sync sequences and the quadrature segment sync symbol pattern. The cross-correlation results are obtained using the same process previously described for estimating the location of the symbol sync sequences. The quadrature segment sync cross-correlation is computed at the lag delay corresponding to the symbol sync sequence correlation peak 172 and the +/−1 sample intervals 174 and 176 around it. Depending on the current resampling delay versus the ideal delay, the center point 172 nearest the zero crossing 178 will be a small positive or negative value, while the outer points 174 and 176 are large positive and negative values. The center value 172 determines the position of the zero-crossing 178. If the center value 172 is positive, as shown more clearly in FIG. 15, the zero crossing 178 is between the center 172 and the last or late sample 176. If the center value 172 is negative, the zero crossing 176 is between the first or early sample 174 and center sample 172. The amount of timing phase update $\Delta t$ needed to be added to or subtracted from the current timing phase offset value $T_{off}$ is computed by finding the zero crossing point 178 of a straight line between the two quadrature segment sync correlation values, separated by a sample interval, which bracket the zero-crossing. In the drawing of FIG. 15, the straight line is computed between the correlation values 172 and 176. If the center point 172 is negative the straight line would be computed between correlation values 172 and 174. The equation below represents the computational process for determining the timing phase offset update value $\Delta t$ for each iteration:

$$\Delta t = \begin{cases} R_{rQ}(0)/(R_{rQ}(1) - R_{rQ}(0)) & R_{rQ}(0) > 0 \\ R_{rQ}(0)/(R_{rQ}(0) - R_{rQ}(-1)) & R_{rQ}(0) < 0 \end{cases} \quad (40)$$

where $R_{rQ}(n)$ is the QSS cross-correlation value at lag=n samples relative to the symbol sync sequence correlation peak. The timing phase offset update value $\Delta t$ is added to the accumulated timing phase offset value $T_{off}$ to produce a new $T_{off}$ value having less error than the previous $T_{off}$ value.

$$T_{off} = T_{off} + \Delta t \quad (41)$$

A timing rate offset $F_{off}$ is updated using the quadrature segment sync cross-correlation to estimate the rate of change of the zero-crossing positions. A rate offset is modeled from individual timing rate offsets for each subrange using a linear model. In the preferred embodiment, the quadrature segment sync cross-correlation is computed for each of the symbol sync sequences, then a weighting factor is applied which is derived from a Least-Square fit to model the zero crossing of each segment sync by a linear function (an unknown constant and rate). The solution of the Least-Squares equation provides the timing rate offset update value:

$$\Delta f = 1/S \cdot \sum_{k=0}^{N-1} W_{LS,rate}(k) \cdot R_{rQ,k}(0) \quad (42)$$

$$W_{LS,rate}(k) = ((k+1) \cdot N - C_1)/(N \cdot C_2 - C_1^2) \; k=(0,1,\ldots N-1) \quad (43)$$

$$C_1 = \sum_{n=1}^{N} n \quad (44)$$

$$C_2 = \sum_{n=1}^{N} n^2 \quad (45)$$

where $R_{rQ,k}(0)$ is the 0-lag QSS cross-correlation of the k-th segment symbol sync sequence, N is the number of segments, and the factor 1/S scales the rate to samples/sample units. It should be noted that the weighting values depend on the number of segments in the data block of signal samples, so these values need to be computed once, then saved for subsequent use.

Figure 16:
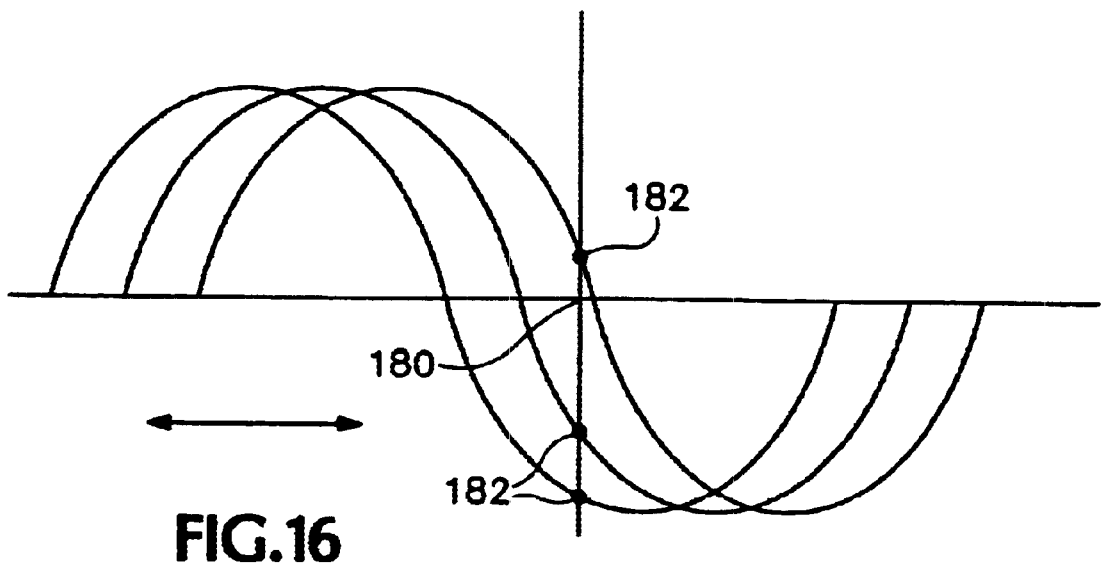
FIG. 16 is a graphical representation of the quadrature segment sync cross-correlation values in the timing rate offset value generation process in the symbol timing synchronizer and resampler incorporated in the measurement receiver demodulator according to the present invention.

FIG. 16 is a graphical representation of the quadrature segment syncs cross-correlation values in the timing rate offset process. If there is no timing rate slewing of the symbol sync sequences, the quadrature segment sync cross-correlations for each symbol sync sequence overlap each other at the zero crossing point 180. If the timing rate is faster than the nominal rate (i.e. the rate of the quadrature symbol sync sequence), then the 0-lag cross-correlations will decrease in value across the sample block, as shown in FIG. 16, and if the timing rate is slower than the nominal value, then the 0-lag cross-correlations will increase in value across the sample block. The summation of products of the 0-lag crossings 182 of the quadrature symbol sync sequence cross-correlation and the weighting factors times the scaling factor provides the timing rate offset update value $\Delta f$. The timing rate offset update value $\Delta f$ times a gain factor $K_1$ is added to the accumulated timing rate offset value $F_{off}$ to produce a new $F_{off}$ value having less error than the previous $F_{off}$ value.

$$F_{off} = F_{off} + K_1 \cdot \Delta f \quad (46)$$

$K_1$ is adjusted to damp out noise in the $\Delta f$ values while allowing reasonably fast convergence to the final value of $F_{off}$.

During each iteration, resampling is performed on the filtered signal samples to correct the current estimated timing phase and rate offset values, $T_{off}$ and $F_{off}$. The amount of delay D introduced by the resampling process varies from iteration to iteration as the feedback process modifies the estimates of timing phase and rate offset values in the subrange signal sample sets. The amount of delay may also increase or decrease across the subrange signal sample sets to account for the timing rate offset value $F_{off}$.

During an iteration, a delay value $D_k$ is computed for each subrange of signal samples surrounding each symbol sync sequence. $D_k$ can be assumed to be a constant over the short subrange interval for moderate amounts of rate offset.

$$D_k = T_{off} + F_{off} \cdot S \cdot k \quad k=[0,1, \ldots N-1] \tag{47}$$

where $T_{off}$ and $F_{off}$ are the current estimated timing phase and rate offset values, respectively.

The resampling process is accomplished using a 3rd-order (4-point) Lagrange interpolation polynomial, which can be used as a fractional delay FIR filter. The filter is defined as:

$$H_D(z) = h_0(D) + h_1(D) \cdot z^{-1} + h_2(D) \cdot z^{-2} + h_3(D) \cdot z^{-3} \tag{48}$$

$$h_0(D) = -(D-1)^*(D-2)^*(D-3)/6 \tag{49}$$

$$h_1(D) = D^*(D-2)^*(D-3)/2 \tag{50}$$

$$h_2(D) = -D^*(D-1)^*(D-3)/2 \tag{51}$$

$$h_3(D) = D^*(D-1)^*(D-2)/6 \tag{52}$$

$$h_D(m) = Z^{-1}[H_D(z)] \tag{53}$$

where D is the fractional (group) delay of the filter, in sample intervals. This is an approximation to the ideal fractional-delay filter $H_{D,ideal}(z) = z^{-D}$.

$D_k$ is used to compute the filter coefficients $h_{Dk}(z)$ for filtered signal sample subranges k, and the filter is applied to those signal samples. This produces a set of filtered, time-adjusted signal samples for the current iteration.

$$r_{resampled}(k,n) = r_{MF}(S \cdot k + n + m) \otimes h_{Dk}(m) \tag{54}$$

$$k=[0,1, \ldots N-1], (\tau_{pk} - \delta) \leq n \leq (\tau_{pk} + \delta)$$

The iteration process is repeated with the new values of $T_{off}$ and $F_{off}$ until a threshold value is reached. This threshold may be a preset number of iterations, an amplitude value related to the zero-crossing point or that the amount of change in $T_{off}$ over several iteration becomes insignificant. In the preferred embodiment of the present invention, the rate of change of $T_{off}$ and a maximum number of iterations threshold is used. The rate of change is based on a sequence of decreasing rate changes over previous iterations. For example, if the current $T_{off}(n)$ is within 0.01% of the previous $T_{off}(n-1)$, and that $T_{off}(n-1)$ is within 0.02% of the previous $T_{off}(n-2)$ and that $T_{off}(n-2)$ is within 0.03% of the previous two $T_{off}(n-3)$, $T_{off}(n-4)$ where n denotes the iteration time index, then the iteration is considered to have minimized the timing phase and rate offsets. If the maximum iteration threshold is exceeded prior to rate of change in the $T_{off}$ threshold being reached, the iteration process is terminated and the process returns the values of $T_{off}$ and $F_{off}$ as the results of the timing estimation process, which are applied to resampling FIR filter process 130 for producing properly synchronized signal samples $r_{ta}(n)$.

The filter, time-aligned signal samples $r_{ta}(n)$ are applied to the signal scaling and pilot remover 80 that estimates a scaling factor and a pilot level for the signal samples. For a small data set, the I-dimension signal samples may not be equally distributed among the 8 constellation landings, especially in the presence of distortion. Thus, the mean of the I-dimension signal samples, a conventional way of estimating pilot level and scaling factor, could be biased. Inaccurate scaling and pilot level estimates impact the performance of equalization. In the preferred embodiment of the invention, a Lloyd_Max quantizer is used for clustering the I-dimension signal samples to estimate a scaling factor. The scaling factor is applied to the I-dimension signal samples associated with each of the quantization levels to scale the I-dimension signal samples to the appropriate constellation level. The quantizer minimizes the mean square error for a given number of quantization levels or clusters M. The mean square quantization error can be measured by setting u to be a real scalar random variable with a probability density function $p_u(u)$ $$\epsilon = E[(u - u^*)^2]$$

$$= \sum_{k=1}^{M} \int_{d_k}^{d_{k+1}} (u - q_k)^2 p_u(u) \, du \tag{55}$$

where $d_k$ (k 1,2, ..., M+1) and $q_k$ (k=1,2, ..., M) are the decision (constellation) and quantization levels respectively, and need to be determined for minimizing $\epsilon$. Setting the derivatives of $\epsilon$ with respect to $d_k$ and $q_k$ to zero will give the optimal $dt_k$ and $q_k$.

$$\frac{\partial \epsilon}{\partial d_k} = 0 \tag{56}$$

$$\frac{\partial \epsilon}{\partial q_k} = 0$$

$$d_k = \frac{(q_k + q_{k-1})}{2} \tag{57}$$

$$q_k = \frac{\int_{d_k}^{d_{(k+1)}} u p_u(u) \, du}{\int_{d_k}^{d_{(k+1)}} p_u(u) \, du} \tag{58}$$

Equation (58) show that the optimal quantization level $q_k$ in the decision region ($d_k$, $d_{k+1}$) is its condition mean in that region.

In implementation, the optimal $d_k$'s and $q_k$'s are searched using the following iterative clustering process:

Sort the I-dimension signal samples s(n) (n=1, 2, ..., N) in ascending order, denoted as x(n)

Quantize x(n) to L level (L>M), denoted as u(n)

$$x_{\max} = x(N) \tag{59}$$

$$x_{\min} = x(1)$$

$$u(n) = round\left(\frac{x(n) - x_{\min}}{x_{\max} - x_{\min}}(L-1) + 1\right)$$

Calculate the probability density function of u(n), denoted as $p_u(k)$ (k=1, ..., L)

Initialize decision boundary level d(k+1) (k 1, ..., M) evenly across L data levels $$t(k+1) = round\left(\frac{kL}{M}\right) + 1 \tag{60}$$

$$t(1) = 1$$

Calculate M clustering levels q(k) according to equations (61) and (62) below $$q(k) = \frac{\sum_{i=d(k)}^{d(k+1)-1} i p_u(i)}{\sum_{i=d(k)}^{d(k+1)-1} p_u(i)} \tag{61}$$

-continued $$d(k) = \frac{q(k)+q(k-1)}{2} \quad k > 1 \quad (62)$$
$$d(1) = 1; d(M+1) = L+1$$

quantization error:

$$\in (k) = \frac{\sum_{i=d(k)}^{d(k+1)-1}(i-q(k))^2 p_u(i)}{\sum_{i=d(k)}^{d(k+1)-1} p_u(i)} \quad (63)$$

If a particular region has no elements i.e. $p_u(i)=0$ for $i=d(k)$ to $d(k+1)-1$, then merge this region to its adjacent region. At the end of one iteration (i.e., after k=1 to M), search for a region m which has the maximum quantization error $\epsilon(m)$ and insert as additional decision boundary level at $q(m)$).

Iterate previous two procedure for T times (e.g., T=5)

Restore the cluster levels q(k)'s to the original scale of data, denoted as q'(k), and calculate final quantization level q(k) (k=1, 2, . . . , M) as follows $$l(k)=E[x(n)|(x(n)-r^1(k))^2<(x(n)-r^1(j))^2, j\neq k, 1\leq j\leq M] \quad (64)$$

For 8-VSB signal samples, the I-dimension samples should ideally cluster at eight evenly spaced levels from l(1)−5.75 to l(8)+8.25 when the pilot level is present. Because linear and nonlinear errors, phase noise and the like are present in the signal samples, the clustering of the data may not fall at the ideal levels. The scaling factor is calculated from quantization levels derived above using the following equation:

$$G_s = \frac{2\times(l(8)-l(1))}{[l_{ref}(8)-l_{ref}(1)]} \quad (65)$$

where l(8) and l(1) are computed constellation levels, $L_{ref}(8)$ and $L_{ref}(1)$ are reference constellation levels, and 2 is an arbitrarily chosen unit spacing between the constellation levels. The scaling factor is applied to the I- and Q-dimension signal samples to scale the samples to approximate the ideal constellation levels. The pilot level is estimated by applying the scaling factor to the quantization levels and summing the scaled quantization levels and dividing by the number of levels. The estimated pilot level is subtracted from the I-dimension signal samples to produce filtered, time-aligned, scaled signal samples $r_{bb}(n)$ at the approximate constellation levels. The filtered, time-aligned, scaled signal samples $r_{bb}(n)$ are stored in memory 20 and output from the first processing channel 70 as unequalized, filtered signal samples at Tsymb/4 or four times the 8-VSB symbol rate. The unequalized, filtered signal samples may also be coupled to a down sampler 81 to produce filtered signal samples at two samples per 8-VSB symbol time (Tsymb/2) or samples at symbol time (Tsymb).

Figure 17:
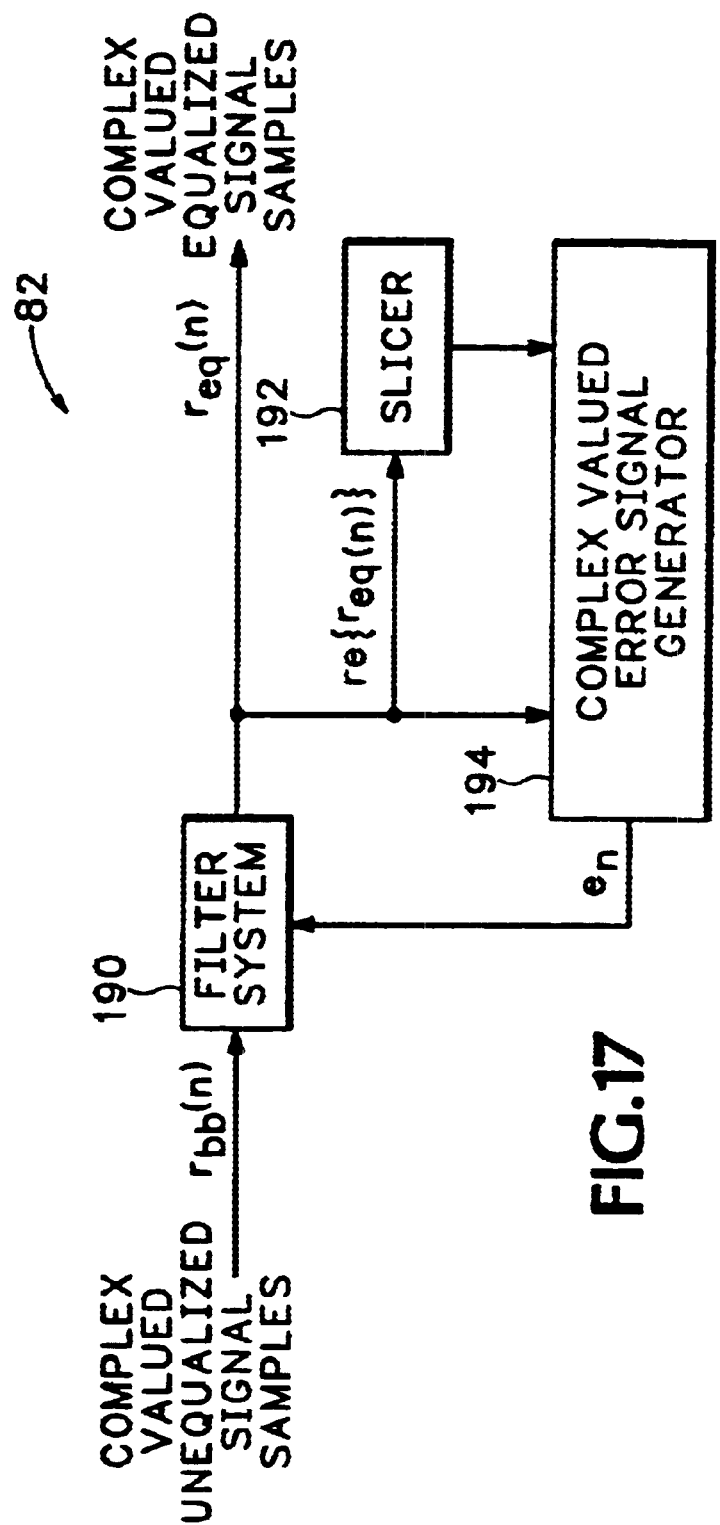
FIG. 17 is a block diagram illustrative of an adaptive equalizer with complex signal regeneration incorporated in the measurement receiver demodulator according to the present invention.

Referring to FIG. 17, the adaptive equalizer 82 receives the filtered, time-aligned, scaled signal samples $r_{bb}(n)$ from memory 20. In the preferred embodiment, approximately 2,000 symbols are processed through the adaptive equalizer 82. The exact number of symbols processed is a matter of design choice but the number should be sufficient to reduce the error signal to a minimum and hence achieve maximum convergence of the equalizer 82 within a reasonable amount of time. A filter system 190 receives the complex valued unequalized signal samples $r_{bb}(n)$ and generates complex valued equalized signal samples $r_{eq}(n)$. The complex filter includes a FIR filter, a multiplier and adder, and a delay to be described in greater detail below. The FIR filter receives updatable filter coefficients values for equalizing the incoming signal samples. A slicer 192 receives the real component values $re\{r_{eq}(n)\}$ of the complex valued equalized signal samples and generates ideal real component values from the real component values. A complex valued error signal generator 194 receives the ideal real component values and the complex valued equalized signal samples. The complex valued error signal generator 194 includes first and second delays, a regeneration filter and a combiner to be described in greater detail below. Ideal imaginary component values are regenerated from the ideal real component values from the slicer 192. The ideal real component values from the slicer 192 are time aligned with the ideal imaginary component values to produce an ideal complex valued reference signal. The equalized complex valued signal samples $r_{eq}(n)$ are time aligned with the reference signal and combined to produce a complex valued error signal $e_n$. The error signal $e_n$ is fed back to the filter system 190 and combined with time aligned vectors of unequalized signal samples for updating the filter coefficients values of the filter system 190.

FIG. 18 shows a more detailed block diagram of the adaptive equalizer 82. The double lines in the figure represents complex valued data and the single lines represents either real or imaginary component values of the complex valued data. The filter system 190 includes a FIR equalization filter 200 and a delay 202 receiving the complex valued unequalized signal samples $r_{bb}(n)$ of the 8-VSB signal stored in memory 20. The number of taps in the equalization filter is determined by a number of factors including the sample frequency of the incoming signal, the time interval to be covered by the filter and the like. As previously described, the preferred embodiment of the invention uses signal samples of the 8-VSB signal digitized at four times the 8-VSB symbol rate. The equalization filter 200 has 80 taps to cover a spreading and recombination range of 2 microsec. (20 symbols×100 nsec./symbol×4 samples per symbol). The equalization filter 200 taps receive updatable coefficients $c_k$ 204 for progressively removing the linear impairments in the 8-VSB signal. The output of the equalization filter 200 is complex valued equalized signal samples $r_{eq}(n)$ computed as $$r_{eq}(n)=r_{bb}(n)\textcircled{x}c_k \quad (66)$$

where $r_{bb}(n)$ is the received unequalized signal samples, $c_k$ is the current equalization filter tap set, $r_{eq}(n)$ is the filtered equalized signal samples, and $\textcircled{x}$ denotes convolution. The delay 202 sufficiently retards the complex values unequalized signal samples to time align the vectors of unequalized signal samples with the corresponding error signal from the complex valued error signal generator 194.

The complex valued error signal generator 194 receives the complex valued equalized signal samples from the equalization filter. The slicer 192 receives the "I" or real component values $re\{r_{eq}(n)\}$ of the equalized signal samples at symbol intervals. The slicer 192 operates in a conventional manner to produce ideal real or "I" component values at the symbol intervals from the real component values. The ideal real component values drive an imaginary or "Q" component regeneration filter $h_{RCQ}$ 206 in the error signal generator 194. In the preferred embodiment, the regeneration filter $h_{RCQ}$ 206 has filter coefficients that produce the imaginary part of a complex raised cosine filter function as represented by the below equation.

$$h_{RCQ}=im\{h_{RC}\} \quad (67)$$

The complex raised cosine filter function hRc is the system response filter function of the 8-VSB transmission system. The regeneration filter 206 produces ideal imaginary or "Q" component values $im\{r_{ref,eq}(n)\}$ at symbol intervals based on the ideal real component values from the slicer 192. In the preferred embodiment, the regeneration filter 206 is a FIR filter, with L=255 taps at symbol interval spacing. The desired response of the regeneration filter 206 depends on the overall filter response of the transmission system in which the adaptive equalizer 82 of the present invention is used. A trade-off is necessary in determining the number of taps in the regeneration filter 206. Increasing the number of taps in the filter increases the accuracy of the filter but decreases the filter speed. A 255-tap filter was chosen as compromise between filter speed and accuracy. The regeneration filter 206 is not limited to the specific 255-tap raised cosine filter function and other filter sizes and filter functions may be used without departing from the scope of the invention set forth in the appended claims.

A delay $z^{-D}$ 208 receives the ideal real component values from the slicer 192 and delays these values an amount corresponding to the delay produced by the regeneration filter 206 to time align the ideal real component values $re\{r_{ref,eq}(n)\}$ with the regenerated ideal imaginary component values $im\{r_{ref,eq}(n)\}$. The regeneration filter 206 delay corresponds to D=(L−1)/2 for a filter with an odd number of filter taps or L/2 for an even number of filter taps. A mathematical representation of the reference ideal signal samples $r_{ref,n}$ containing the time aligned real and imaginary component values $re\{r_{ref,eq}(n)\}$ and $im\{r_{ref,eq}(n)\}$ is:

$$r_{ref,n}=\text{slicer}(re\{r_{eq-D}\})+j\cdot[\text{slicer}(re\{r_{eq}\})\otimes h_{RCQ}] \quad (68)$$

The complex valued equalized signal samples pass though delay $z^{-D}$ 210 that retards the signal samples an amount corresponding to the delay of the regeneration filter to time align the signal samples $r_{eq-D}$ to the corresponding reference signal samples $r_{ref,n}$. The delays 202, 208, and 210 provide storage to synchronize the various equalizer signal samples and component values with the regeneration filter 206 output. A combiner 212 receives the reference signal samples $r_{ref,n}$ of the complex valued equalized signal samples and the time aligned complex valued equalized signal samples $r_{n-D}$ from delay 210. The combiner performs a summation process to produce a complex valued error signal en from the difference between the complex valued equalized signal samples and the reference signal samples as shown below.

$$e_n=r_{ref,n}-r_{n-D} \quad (69)$$

In traditional adaptive equalizers, a fixed adaptation factor or scalar is applied to the error signal fed back to the filter system 190 for updating the equalization filter coefficients 204. The value of the constant adaptation factor is a tradeoff between convergence speed and noise in the equalizer 82 output. A large adaptation factor value allow a greater range of values for the equalization filter coefficients for faster convergence. However, as the coefficients converge, they can still vary over the range set by the adaptation factor. The variation in coefficient values translates into noise in the output of the equalizer 82. Smaller adaptation factors reduce the noise but slow the convergence process and may not provide sufficient coefficient variation even to allow convergence.

The equalizer 82 includes a variable adaptation factor, β, that is applied to the complex valued error signal $e_n$ for controlling the convergence of the adaptive equalizer 82. β is applied to a multiplication function 214 along with the complex valued error signal $e_n$. β scales the error signal $e_n$ to vary the convergence of the equalizer 82 over one or more successive inputs of the unequalized signal samples. As convergence is achieved with successive iterations of the unequalized signal samples through the equalizer 82, the value of beta is decreased. In the present invention, the initial value of beta is set to $2.5\times10^{-5}$. This value was derived empirically by applying distorted data to the equalizer 82 and observing how the equalizer converged. The stored unequalized signal samples are passed through the equalizer up to three times with the value of beta being respectively decreased to $2.5\times10^{-5}/3$ and $2.5\times10^{31}\ ^5/10$.

The adaptive equalizer 82 and the process of equalization is referred to in the art as a decision or data directed equalizer. If during the convergence process, the error signal $e_n$ does not progressively decrease indicating convergence of the equalizer 82, the controller 24 may initiate a blind equalization process to determine initial coefficient values for the equalization filter before progressing to the decision directed equalization process. The equalizer 82 in the preferred embodiment has a convergence detection filter 216 for receiving the real component values of the error signal and calculating a running standard deviation. The convergence detection filter 216 generates an output signal, such as a flag, true/false indication or the like, to indicate achievement of equalizer convergence. The controller 24 receives the output signal and initiates the blind equalization process when the standard deviation of the error signal does not decrease. The above described variable adaptation factor and use is by example only. Other adaptation factor values may be used as well as increasing or decreasing the number of values as well as the number of passes of the input data without departing from the scope of the invention.

The complex valued error signal $e_n$, scaled by beta, is fed back to a multiplier 218 in the filter system 190. The multiplier 218 also receives delayed vectors of unequalized signal samples from delay $z^{-D}$ 202 that are time aligned with the error signal $e_n$. The delay 202 retards the vectors of unequalized signal samples an amount corresponding to the delay of the regeneration filter 206. The conjugate of the signal samples in the vector array being applied to the multiplier 218 is obtained by changing the sign of the imaginary part of the signal samples in the vectors. The multiplier 218 performs a multiplication function on the vectors using the complex valued error signal $e_n$ as a scalar. An adder 220 receives the scaled vectors along with the current equalization filter coefficient values $c_k$ 204. The filter coefficient values 204 are updated by adding the error signal scaled vector array values with the current filter coefficient values as represented by the equation below:

$$c_{k+1}=c_k+\beta\cdot e_n\cdot\text{conj}(r_{bb-D}) \quad (70)$$

The updated coefficient values 204 are applied to the equalization filter 200.

As previously stated, the adaptive equalizer 82 equalizes signal samples of a digitized and down converted 8-VSB signal. One component of the 8-VSB signal is a pilot tone that is removed after the down conversion to baseband. Incomplete removal of the pilot tone produces a DC offset in the real component values of the signal samples applied to the equalizer 82, which generates a DC error term in the real component values of the error signal adversely effecting the equalization process. To assure that DC offsets do not affect the equalization process, the equalizer 82 includes an offset filter 222 that receives the real component values of the error signal and generates an estimate of the real component offset. The offset estimate is calculated over subsets of the overall set of signal samples. The offset estimate of the subsets is fed back to a combiner 224 at the input to the filter system 190. The combiner 224 subtracts the offset estimate from the incoming real component values of the unequalized complex valued signal samples $r_{bb}(n)$ to decrease the DC offset that may be present due to the pilot tone in the signal samples. As the equalization process proceeds, the offset estimate feed back process continually improves the DC offset suppression.

The filtered, time-aligned, scaled, equalized signal samples $r_{eq}(n)$ from equalizer 82 are stored in memory 20 and output from the first processing channel 70 as filtered signal samples at Tsymb/4 or four times the 8-VSB symbol rate. The filtered, equalized signal samples may also be coupled to a down sampler 83 to produce filtered signal samples at two samples per 8-VSB symbol time (Tsymb/2) or samples at symbol time (Tsymb).

The second processing channel 84 receives the down converted signal samples $r_{dc}(n)$ from memory 20. The FIR compensation filter 86 receives the down converted signal samples $r_{dc}(n)$ and the filter compensation coefficients 76 that compensate for linear distortions introduced by the hardware of the front end circuitry 12. The FIR compensation filter 86 filters the signal samples $r_{dc}(n)$ to suppress the linear distortions introduced by the hardware front end circuitry and produce compensated signal samples $u_c(n)$. Note that the compensation filter 86 does not include the filter coefficients that produces the filter response of the transmission system receiver filter. Since strong nonlinearity causes signal spectrum spreading, the transmission system's receiver filter could significantly attenuate the out-of-band portion of the spread spectrum signal with the loss of spectral information characterized by the nonlinear distortions.

The compensated signal samples $u_c(n)$ are applied to a resampling FIR filter 88 that receives the time and rate offset parameters from the symbol timing synchronizer 78 in the first processing channel. The resampling filter 88 synchronizes the compensated signal samples $u_c(n)$ to symbol instances of the modulation data to produce compensated, time-aligned signal samples $u_{ta}(n)$. The scalar 90 receives the compensated, time-aligned signal samples $u_{ta}(n)$ and the scaling factor generated in the signal scaling and pilot remover 80 of the first processing channel 70. The scaling factor is applied to the signal samples $u_{ta}(n)$ to produce scaled, time-aligned, compensated signal samples $u_{bb}(n)$. The unfiltered, time-aligned, scaled signal samples $u_{bb}(n)$ are stored in memory 20 and output from the second processing channel 84 as unequalized, unfiltered signal samples at Tsymb/4 or four times the 8-VSB symbol rate. The FIR equalization filter 92 receives the scaled, time-aligned, compensated signal samples $u_{bb}(n)$ and the equalization coefficients produced by the equalizer 82 in the first processing channel 70. The FIR equalization filter 82 is a linear filter having an inverse magnitude and phase response with respect to that of the received signal r(n) that corrects frequency-dependent magnitude and phase deviations in the signal samples. The output of the FIR equalization filter 92 are compensated, time-aligned, scaled, equalized signal samples $u_{eq}(n)$. The compensated, time-aligned, scaled, equalized signal samples $u_{eq}(n)$ from FIR equalization filter 92 are stored in memory 20 and output from the second processing channel 84 as unfiltered signal samples at Tsymb/4 or four times the 8-VSB symbol rate. The unfiltered, equalized signal samples may also be coupled to a down sampler 93 to produce filtered signal samples at two samples per 8-VSB symbol time (Tsymb/2) or samples at symbol time (Tsymb).

The above described demodulator 34 has been described as a series of processes executed by the processor 24 of a measurement receiver 10 under program instructions. The elements and structure of the demodulator 34 of the present invention may equally be implemented using hardware circuitry. The elements of the demodulator may be implemented as discrete filters, logic circuits and delay lines. Alternatively, the elements may be implemented in one or more application specific integrated circuit (ASIC) device(s) or a combination or discrete circuit element and ASIC device(s). Further, the demodulator of the present invention may be implemented with a combination of hardware circuitry and processes executed by a implemented with a combination of hardware circuitry and processes executed by a processor under program instructions.

A demodulator for measurement receiver has been described having first and second processing channels for respectively producing filtered and unfiltered signal sample outputs. The first processing channel receives stored signal samples of digitally modulated intermediate frequency signal in a down converter produces down converted signal samples. The down converted signal samples are processed through a FIR filter having filter coefficients that produce a filter response of the transmission system receiver filter, which in the preferred embodiment is a root raised cosine filter, and compensation for linear distortions introduced by the hardware of the front end circuitry 12 to produce filtered signal samples. The filtered signal samples are processed through a symbol time synchronizer and resampler that produces timing phase and rate offset parameters that are applied to a resampler to produce signal samples synchronized with symbol instances. The filtered, time-aligned signal samples are processed through a signal scalar and pilot remover that produces a scaling factor and a pilot level estimation, the filtered, time-aligned signal samples are scaled with the scaling factor and the estimated pilot level is applied to the scaled signal samples to remove the estimated pilot level. The filtered, time-aligned, scaled signal samples are processed through an equalizer that produces equalization filter coefficients using a complex values error signal. The filtered, time-aligned, scaled signal samples and the filtered, time-aligned, scaled, equalized signal samples are output from the first processing channels as filtered signal samples processed using the transmission system receiver filter.

The second processing channel receives the down converted signal samples from the first processing channel and processes the signal samples through a FIR filter having filter coefficients that compensate for linear distortions introduced by the hardware of the front end circuitry 12. The compensated signal samples from the FIR compensation filter are processed through a resampler receiving the timing phase and rate offset parameters form the first processing channel. The resampler produces signal samples synchronized with symbol instances. The compensated, time-align signal samples are applied to a scalar that receives the scaling factor from the first processing channel to produce compensated, time-aligned signal samples. A equalization filter receives the compensated time-aligned signal samples and the filter coefficients from the equalizer of the first processing channel and produces compensated, time-aligned, scaled, equalized signal samples that are output as unfiltered signal samples.

Thus, a measurement receiver demodulator producing filtered and unfiltered outputs has been described. Whereas many alteration and modifications to the present invention will be comprehended by a person skilled in the art after having read the foregoing description, it is to be understood that the particular embodiments shown and described by way of illustration are in no way intended to be considered limiting. References to details of particular embodiments are not intended to limit the scope of the appended claims.

What is claimed is:

1. A demodulator for a measurement receiver receiving a radio frequency signal modulated with data symbols at a symbol frequency generated by a transmission system having a transmitter filter and a receiver filter where the digitally modulated radio frequency signal is down converted to a digitally modulated intermediate frequency signal and digitized to produce signal samples of the intermediate frequency signal by hardware front end circuitry, the demodulator comprising:

a first processing channel receiving the signal samples and producing filtered signal samples using the transmission system receiver filter with the first processing channel having subchannels with one subchannel producing filtered equalized signal samples and a second subchannel producing filtered unequalized signal samples; and a second processing channel bypassing the transmission system receiver filter receiving the signal samples and producing unfiltered signal samples with the second processing channel having subchannels with one subchannel producing unfiltered equalized signal samples and a second subchannel producing unfiltered unequalized signal samples.

2. The demodulator as recited in claim 1 wherein the first and second subchannels of the first processing channel further comprises:

a down converter receiving the intermediate frequency signal samples and producing baseband signal samples;

a digital filter having combined filter coefficients producing a transmission system receiver filter response and compensating for the hardware front end circuitry receiving the baseband signal samples and generating filtered baseband signal samples;

a symbol timing synchronizer having a resampler receiving the filtered baseband signal samples and a timing estimator receiving the combined filter coefficients and the baseband signal samples with the timing estimator generating timing and phase offset parameters that are applied to the resampler to produce time-aligned, filtered baseband signal samples;

a scaler receiving the time-aligned, filtered baseband signal samples and estimating a scaling factor that is applied to the signal samples to produce scaled, time-aligned, filtered baseband signal samples that are output as filtered unequalized signal samples from the second subchannel; and an equalizer receiving the scaled, time-aligned, filtered baseband signal samples and generating equalizer coefficients that are applied to an equalization filter to produce equalized, scaled, time-aligned, filtered baseband signal samples that are output as filtered equalized signal samples from the first subchannel.

3. The demodulator as recited in claim 1 wherein the first and second subchannels of the first processing channel further comprises:

a down converter receiving the intermediate frequency signal samples and producing baseband signal samples;

a first digital filter having filter coefficients compensating for the hardware front end circuitry receiving the baseband signal samples and generating compensated baseband signal samples;

a second digital filter having filter coefficients producing a transmission system receiver filter response receiving the compensated baseband signal samples and generating filtered baseband signal samples;

a symbol timing synchronizer having a resampler receiving the filtered baseband signal samples and a timing estimator receiving the combined filter coefficients and the baseband signal samples with the timing estimator generating timing and phase offset parameters that are applied to the resampler to produce time-aligned, filtered baseband signal samples;

a scaler receiving the time-aligned, filtered baseband signal samples and a estimating scaling factor that is applied to the signal samples to produce scaled, time-aligned, filtered baseband signal samples that are output as filtered unequalized signal samples from the second subchannel; and an equalizer receiving the scaled time-aligned filtered baseband signal samples and generating equalizer coefficients that are applied to an equalization filter to produce equalized, scaled, time-aligned, filtered baseband signal samples that are output as filtered equalized signal samples from the first subchannel.

4. The demodulator as recited in claim 1 wherein the digitally modulated radio frequency signal includes a pilot signal and the first and second subchannels of the first processing channel further comprises:

a down converter receiving the intermediate frequency signal samples and producing baseband signal samples having a pilot level;

a digital filter having combined filter coefficients producing a transmission system receiver filter response and compensating for the hardware front end circuitry receiving the baseband signal samples and generating filtered baseband signal samples;

a symbol timing synchronizer having a resampler receiving the filtered baseband signal samples and a timing estimator receiving the combined filter coefficients and the baseband signal samples with the timing estimator generating timing and phase offset parameters that are applied to the resampler to produce time-aligned, filtered baseband signal samples;

a scaler receiving the time-aligned filtered baseband signal samples and producing a scaling factor that is applied to the time-aligned filtered baseband signal samples to produce scaled, time-aligned, filtered baseband signal samples with the pilot level;

a pilot level remover receiving the scaled, time-aligned, filtered baseband signal samples that estimates and removes the pilot level to produce scaled, time-aligned, filtered baseband signal samples that are output as filtered unequalized signal samples from the second subchannel; and an equalizer receiving the scaled, time-aligned, filtered baseband signal samples and generating equalizer coefficients that are applied to an equalization filter to produce equalized, scaled, time-aligned, filtered baseband signal samples that are output as filtered equalized signal samples from the first subchannel.

5. The demodulator as recited in claim 1 wherein the digitally modulated radio frequency signal includes a pilot signal and the first and second subchannels of the first processing channel further comprises:

- a down converter receiving the intermediate frequency signal samples and producing baseband signal samples having a pilot level;
- a first digital filter having filter coefficients compensating for the hardware front end circuitry receiving the baseband signal samples and generating compensated baseband signal samples;
- a second digital filter having filter coefficients producing a transmission system receiver filter response receiving the compensated baseband signal samples and generating filtered baseband signal samples;
- a symbol timing synchronizer having a resampler receiving the filtered baseband signal samples and a timing estimator receiving the combined filter coefficients and the baseband signal samples with the timing estimator generating timing and phase offset parameters that are applied to the resampler to produce time-aligned, filtered, baseband signal samples;
- a scaler receiving the time-aligned filtered baseband signal samples and producing a scaling factor that is applied to the time-aligned filtered baseband signal samples to produce scaled, time-aligned, filtered baseband signal samples with the pilot level;
- a pilot level remover receiving the scaled, time-aligned, filtered baseband signal samples that estimates and removes the pilot level to produce scaled, time-aligned, filtered baseband signal samples that are output as filtered unequalized signal samples from the second subchannel; and
- an equalizer receiving the scaled time-aligned filtered baseband signal samples and generating equalizer coefficients that are applied to an equalization filter to produce equalized, scaled, time-aligned, filtered baseband signal samples that are output as filtered equalized signal samples from the first subchannel.

6. The demodulator as recited in claim 1 wherein the intermediate frequency signal samples include a pilot tone and the first and second subchannels of the first processing channel further comprises:

- a down converter receiving the intermediate frequency signal samples and producing baseband signal samples having a pilot level;
- a digital filter having combined filter coefficients producing a transmission system receiver filter response and compensating for the hardware front end circuitry receiving the baseband signal samples and generating filtered baseband signal samples;
- a symbol timing synchronizer having a resampler receiving the filtered baseband signal samples and a timing estimator receiving the combined filter coefficients and the baseband signal samples with the timing estimator generating timing and phase offset parameters that are applied to the resampler to produce time-aligned, filtered baseband signal samples;
- a scaler and pilot level remover receiving the time-aligned, filtered baseband signal samples and estimating a scaling factor and a pilot level that are applied to the signal samples to produce scaled, time-aligned, filtered baseband signal samples that are output as filtered unequalized signal samples from the second subchannel; and
- an equalizer receiving the scaled time-aligned filtered baseband signal samples and generating equalizer coefficients that are applied to an equalization filter to produce equalized, scaled, time-aligned, filtered baseband signal samples that are output as filtered equalized signal samples from the first subchannel.

7. The demodulator as recited in claims 2, 3, 4, 5, or 6 wherein the intermediate frequency signal samples are acquired at N times the symbol frequency where N is greater than 1 and the first subchannel of the first processing channel further comprises a down sampler having a decimation factor equal to N receiving the equalized, scaled, time-aligned, filtered baseband signal samples for generating down sampled equalized, scaled, time-aligned, filtered baseband signal samples that are output as filtered equalized signal samples from the first subchannel.

8. The demodulator as recited in claims 2, 3, 4, 5, or 6 wherein the intermediate frequency signal samples are acquired at N times the symbol frequency where N is greater than 1 and the second subchannel of the first processing channel further comprises a down sampler having a decimation factor equal to N receiving the scaled, time-aligned, filtered baseband signal samples for generating down sampled scaled, time-aligned, filtered, unequalized baseband signal samples that are output as filtered unequalized signal samples from the second subchannel.

9. The demodulator as recited in claim 1 wherein the first and second subchannels of the second processing channel further comprises:

- a first digital filter receiving the baseband signal samples and filter coefficients that compensate for the hardware front end circuitry from the first processing channel that are applied to the baseband signal samples to generate compensated baseband signal samples;
- a resampling filter receiving the compensated baseband signal samples and the timing and phase offset parameters from the symbol timing synchronizer that are applied to the resampling filter to produce time-aligned, compensated baseband signal samples;
- a scaler receiving the time-aligned, compensated baseband signal samples and the scaling factor from the first processing channel scaler that is applied to the time-aligned, compensated baseband signal samples to generate scaled, time-aligned, compensated baseband signal samples that are output as unfiltered unequalized signal samples from the second subchannel; and
- a second digital filter receiving the scaled, time-aligned, compensated baseband signal samples and equalizer coefficients from the first processing channel equalizer that are applied to the second digital filter to produce equalized, scaled, time-aligned baseband signal samples that are output as unfiltered equalized signal samples from the first subchannel.

* * * * *